United States Patent
Latifi et al.

(10) Patent No.: US 11,676,166 B1
(45) Date of Patent: *Jun. 13, 2023

(54) SYSTEM AND METHOD FOR PERSONALIZED PRODUCT COMMUNICATION, CONVERSION, AND RETARGETING

(71) Applicant: Hafta Have, Inc., Huntsville, AL (US)

(72) Inventors: Amanda Latifi, Nashville, TN (US); Nickolay Tyschenko, Los Angeles, CA (US)

(73) Assignee: HAFTA-HAVE, INC., Huntsville, AL (US)

( * ) Notice: Subject to any disclaimer, the term of this patent is extended or adjusted under 35 U.S.C. 154(b) by 118 days.

This patent is subject to a terminal disclaimer.

(21) Appl. No.: 17/221,114

(22) Filed: Apr. 2, 2021

Related U.S. Application Data

(63) Continuation of application No. 16/122,458, filed on Sep. 5, 2018, now Pat. No. 10,970,731.

(Continued)

(51) Int. Cl.
*G06Q 30/02* (2023.01)
*G06Q 30/0217* (2023.01)
(Continued)

(52) U.S. Cl.
CPC ..... *G06Q 30/0217* (2013.01); *G06Q 30/0236* (2013.01); *G06Q 30/0627* (2013.01);
(Continued)

(58) Field of Classification Search
CPC .............. G06Q 30/02; G06Q 30/0217; G06Q 30/0236; G06Q 30/0627; G06Q 30/0635;
(Continued)

(56) References Cited

U.S. PATENT DOCUMENTS

| 8,473,341 B1* | 6/2013 | Walker | G06Q 30/0207 705/14.1 |
| 2007/0192170 A1* | 8/2007 | Cristol | G06Q 40/06 705/7.12 |

(Continued)

FOREIGN PATENT DOCUMENTS

| WO | WO2016/032922 A1 * | 3/2016 | ............. G06Q 30/00 |

OTHER PUBLICATIONS

Noura Abdaoui; Ismahene Hadj Khalifa; Sami Faiz, Sending a personalized advertisement to loyal customers in the ubiquitous environment (English), 2016 7th International Conference on Sciences of Electronics, Technologies of Information and Telecommunications (SETIT) (pp. 40-47), (Year: 2016).*

*Primary Examiner* — Marilyn G Macasiano
(74) *Attorney, Agent, or Firm* — Stephen H. Hall; Bradley Arant Boult Cummings LLP

(57) ABSTRACT

The present disclosure relates to systems and methods for personalized product communication, conversion, and retargeting. In some embodiments, the disclosure is directed to systems and methods that allows users to capture product-specific purchase intent by sending a cellular message containing a picture of a product tag, receiving that product's internet URL in reply via cellular message, and receiving later promotions related to that product from a retailer via cellular messages. In some embodiments, the present inventions allows the unique capability to capture and convert in-store interest with product specific promotions and conversions in a way not previously utilized in the retail space.

20 Claims, 30 Drawing Sheets

Related U.S. Application Data

(60) Provisional application No. 62/554,393, filed on Sep. 5, 2017.

(51) Int. Cl.
*G06Q 30/0601* (2023.01)
*G06Q 30/0207* (2023.01)
*H04L 51/10* (2022.01)
*G06K 7/14* (2006.01)

(52) U.S. Cl.
CPC ......... *G06Q 30/0635* (2013.01); *H04L 51/10* (2013.01); *G06K 7/1413* (2013.01)

(58) Field of Classification Search
CPC ............. G06Q 30/0254; G06Q 10/067; G06Q 30/0246; G06Q 30/0207; H04L 51/10; G06K 7/1413
See application file for complete search history.

(56) References Cited

U.S. PATENT DOCUMENTS

| | | | |
|---|---|---|---|
| 2011/0276396 A1* | 11/2011 | Rathod | H04L 12/18 705/14.49 |
| 2017/0039613 A1* | 2/2017 | Kaehler | G02B 27/0172 |
| 2017/0109767 A1* | 4/2017 | Shpanya | G06Q 30/0206 |
| 2017/0228760 A1* | 8/2017 | Mason-Gugenheim | G06K 19/06112 |
| 2018/0137521 A1* | 5/2018 | Norby | G06Q 30/0201 |

* cited by examiner

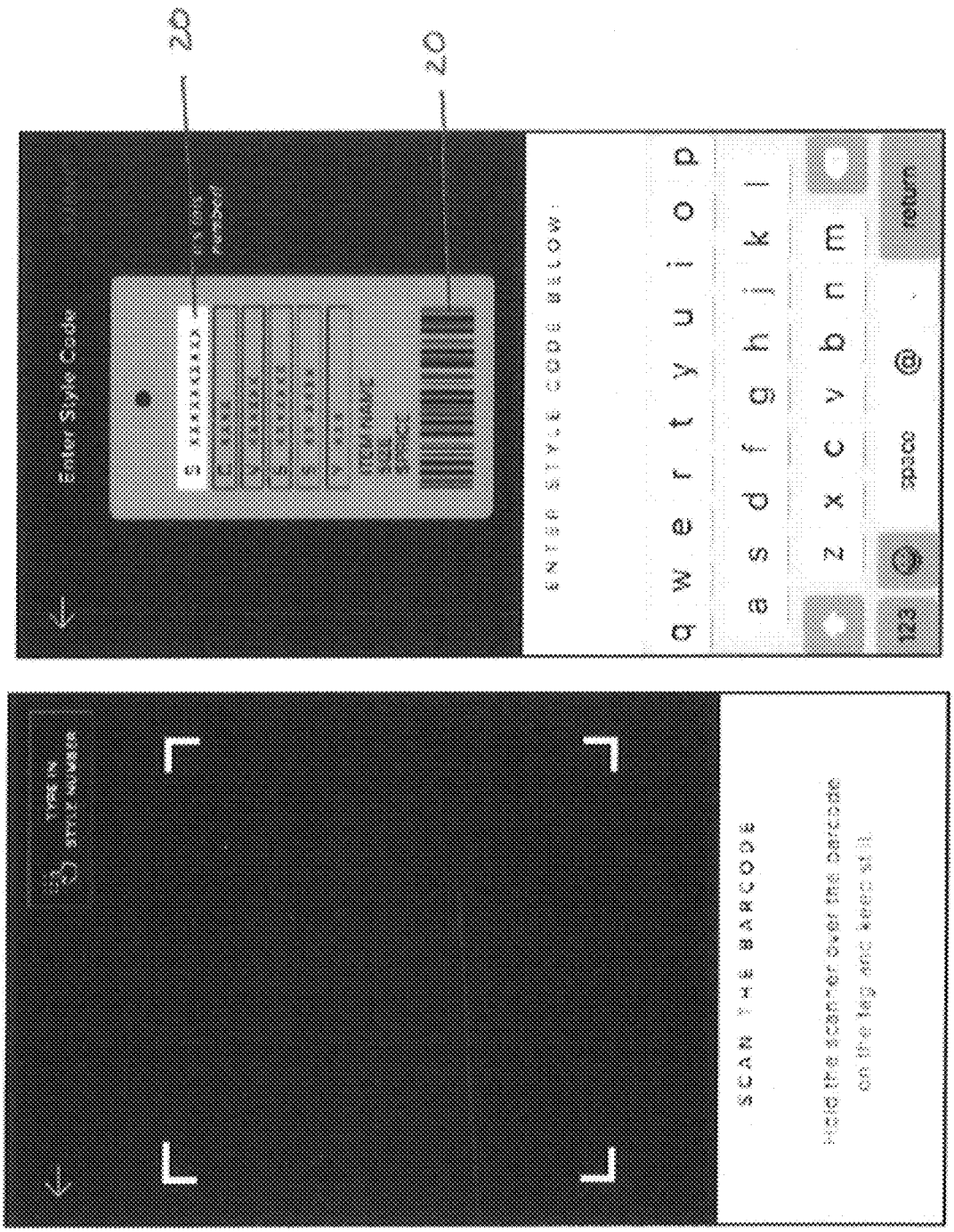

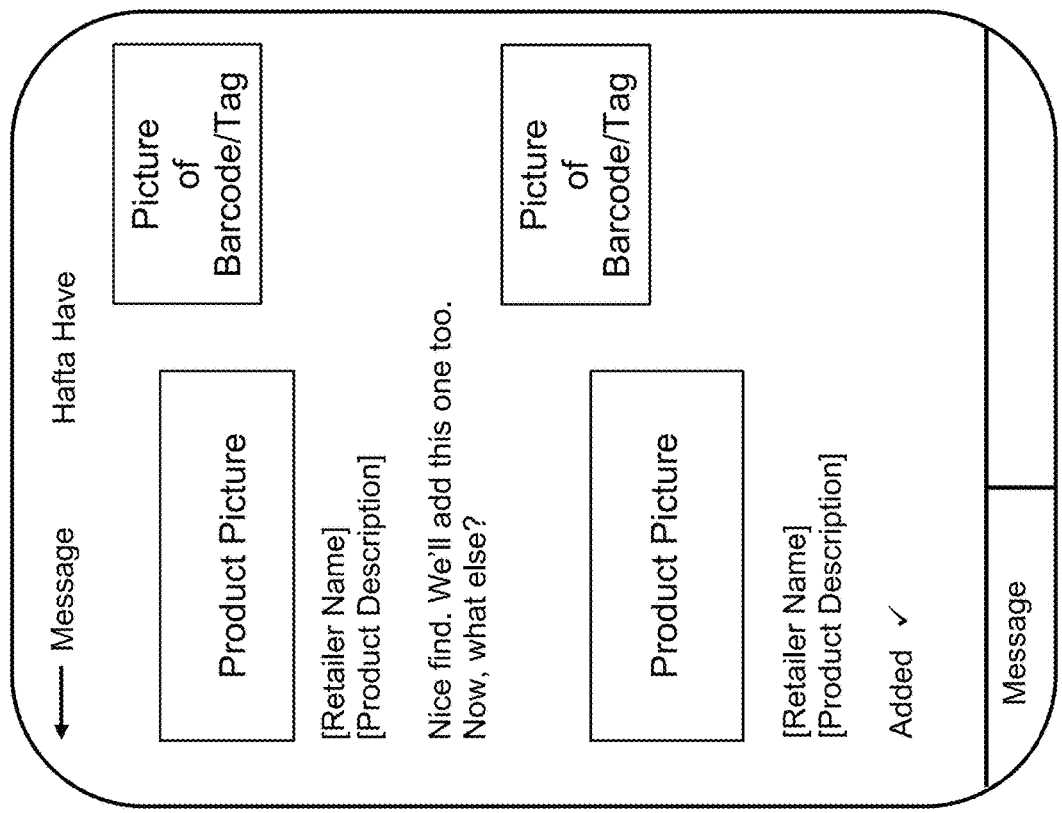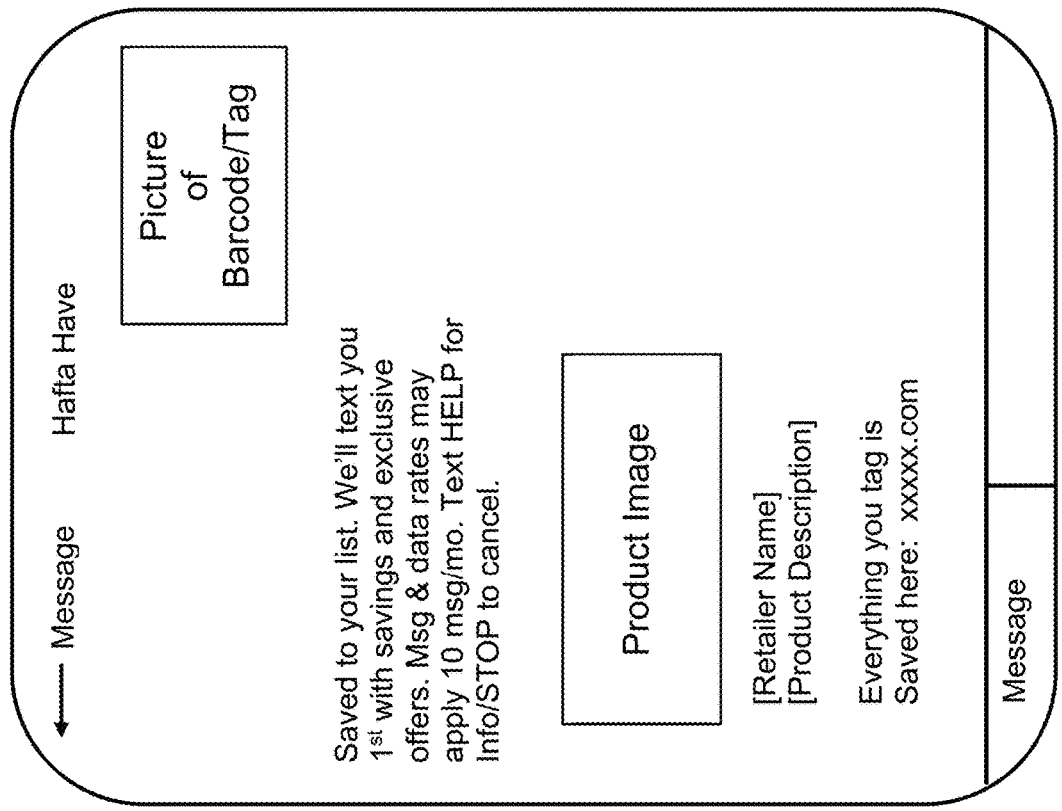
Figure 21(a)
Figure 21(b)

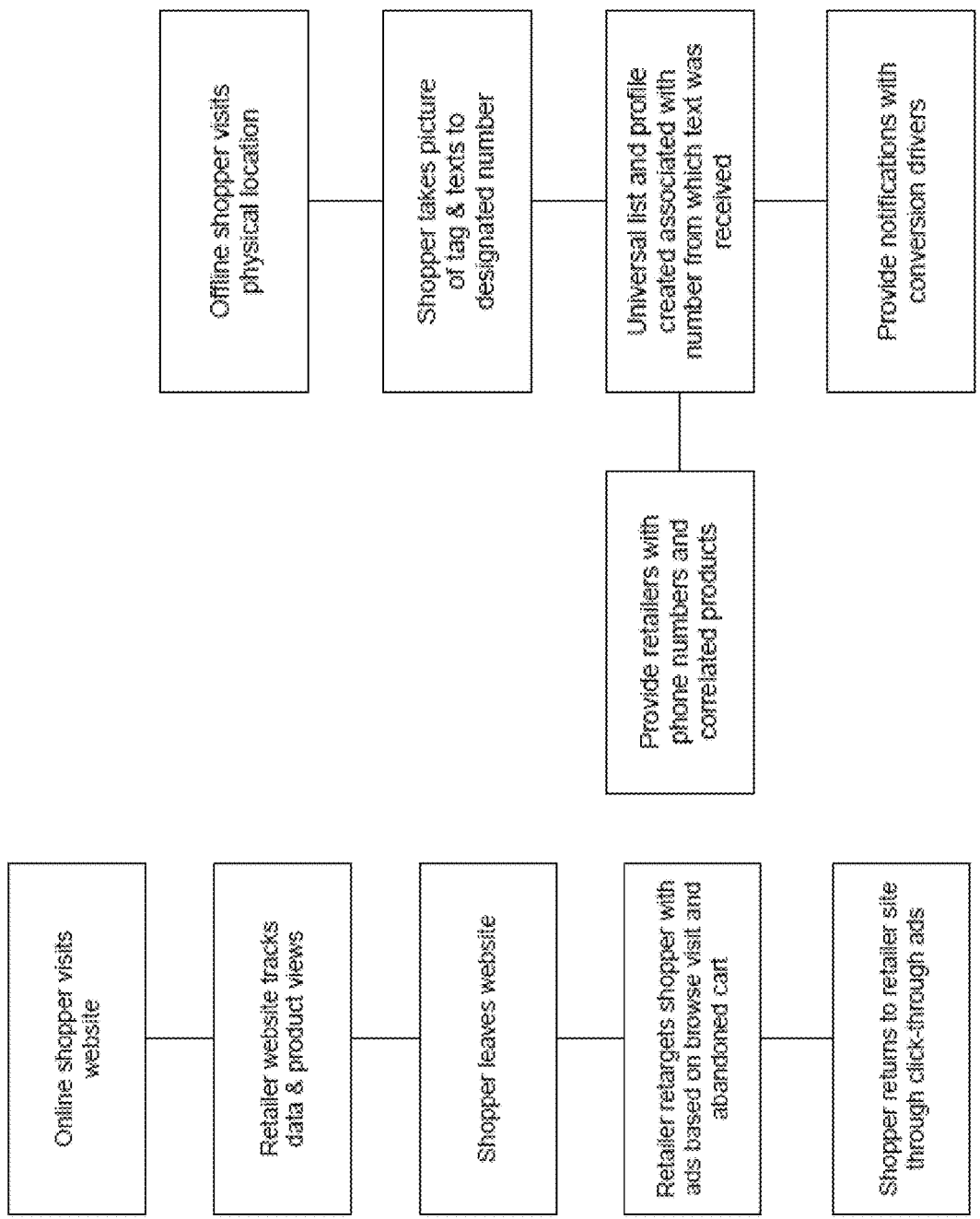

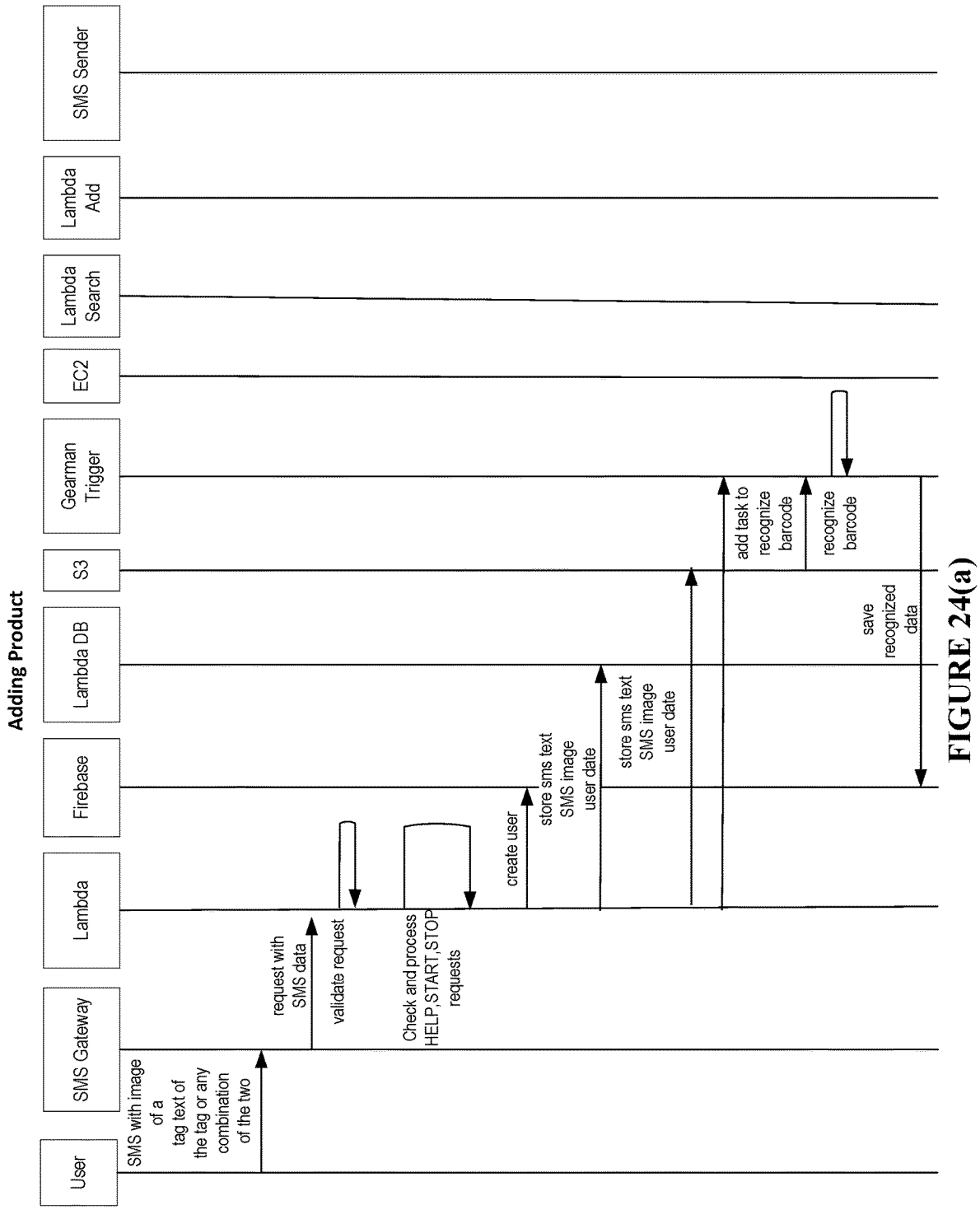

SYSTEM AND METHOD FOR PERSONALIZED PRODUCT COMMUNICATION, CONVERSION, AND RETARGETING

CROSS REFERENCE TO RELATED APPLICATIONS

This application is a continuation of, and claims priority to, and the benefit of, U.S. application Ser. No. 16/122,458 titled "System and Method for Personalized Product Communication, Conversion, and Retargeting," filed Sep. 5, 2018, which claims the benefit of, and priority to, U.S. Provisional Application No. 62/554,393 filed on Sep. 5, 2017, and the entire contents of each of the foregoing are incorporated by reference herein.

FIELD OF THE DISCLOSURE

The present disclosure pertains to the field of shopping. More specifically, the present disclosure pertains to a system and method for personalized product communication, conversion, and retargeting. In some embodiments, the disclosure is directed to systems and methods that allows users to save items they have identified in a store and want to receive relevant notifications about. In some embodiments, the disclosure is directed to systems and methods that capture product-specific purchase intent and shopper data for conversion and retargeting by a retailer. In some embodiments, the disclosure is directed to a user-directed shopping application, inventory tracking, and notifications, and the system and processes can provide improvements and advancements over what is currently known and used in the shopping industry. The disclosed systems and methods utilize a new paradigm for offline and online shopping, tracking, and notifications, and address specific Internet-centric challenges that allows both users to direct and manage the offline and online shopping experience and for retailers to reduce general sale messaging, shift to personalized product communication, and convert in-store shoppers with real-time exclusive offers. As a result, vendors utilizing e-commerce websites to promote and sell their products can increase sales, and user's satisfaction, and brand loyalty is improved. The disclosed systems and methods offer consumers mobile, in-store solutions offering $1^{st}$ access to sale and product specific promotions. The disclosed systems and methods also offer retailers an enterprise solution for capturing product-specific purchase intent, plus shopper data for conversion and retargeting.

BACKGROUND

Traditionally, shoppers may locate products, for example clothing, that they may want in a variety of ways. One way for shoppers to search and review products they may want to purchase is to look on a particular vendor's e-commerce or mobile commerce ("mcommerce") platform, i.e., the vendor's website. Many vendors include a number of different windows, search options, and categories for different types of inventory. For example, for a clothing vendor, the vendor's website may allow a user to search all dresses, all pants, or all items currently on sale. These products may be available for purchase over the internet using standard e-commerce platforms, or direct the user to store locations that may have the product in inventory. Unfortunately, many vendors may have hundreds of different types and styles, making it difficult to locate a particular type or style that appeals to the user. Often, users can get overwhelmed by the sheer amount of options. As used herein, for simplicity, the term "clothing" is used to generally refer to items that may include traditional clothing, like shirts, pants, jackets, socks, etc., but also include other items like shoes, purses, jewelry, etc.

Additionally, shoppers might look in catalogs distributed by vendors, newspaper promotions, or other print media or electronic media. For many shoppers, seeing a particular product on a webpage, or in a print advertisement, is not sufficient to really determine if they like the particular product. Many shoppers want to see the product in person, and touch it, feel it, and potentially try it (for example, put it on, for clothing). This cannot readily be done via a website or through print media. As an example, since different clothing vendors size products differently, a shopper may not know whether a medium or a small would be appropriate for them. For these reasons, among others, shoppers might also visit brick and mortar establishments seeking to locate products that they might be interested in buying.

Visiting a brick and mortar location, however, has its own limitations and drawbacks. If a user locates a particular product they are interested in, but do not plan to purchase the product at the time, shoppers may forget what item they've looked at, what size they tried on, what color they liked, etc. Shoppers may keep written notes about the products, but those can easily be lost. Additionally, shoppers have no way of knowing whether that same item may be in the inventory at a particular vendor at some later point in time, if it goes on sale, or plans to be discontinued.

For various reasons, shoppers that locate a particular item that they like may not want to purchase the item. Shoppers may not have sufficient time or funds to buy the item, or they may just want to put the product on a saved, personal list for potential later purchase. It can be difficult, however, to track what products they have seen, where they located it, what they liked about it, etc. These prior art methods and systems are insufficient to provide users with the user-directed online shopping, tracking, and notifications they need, nor do they provide retailers with the necessary information to specifically and effectively retarget in-store shoppers.

Many retailers also try to target consumers that have expressed an interest in a particular product. For example, if a user goes to a retailer's website, and looks at a variety of shoes, the retailer's website is able to track that a user viewed certain shoes, and can use that information to target advertising to that specific user. However, unless a consumer actually puts certain products into their virtual shopping cart, the granularity of the data may not be particularly helpful for retargeting. For example, the retailer may not know the specific dress that the user was interested in, or the color, size, etc.

Additionally, the conversion rate, or buy rate, for most consumers viewing products online is relatively low, and is often around 5-10%. Most sales still happen "in store", and is closer to 90%. Unfortunately for retailers, to date, there is virtually no way for retailers to accurately capture, track, and/or retarget consumers that are shopping in store. If a retailer could be able to track and retarget consumers based on specific products that the consumer was interested in, and particularly if the retailer could track and retarget consumers at a granular level (e.g., down to the color and size), it would be very valuable to retailers.

Accordingly, there exists a need for user-directed shopping, tracking, and notification systems and methods that address the Internet-centric challenges. Additionally, there exists a need for systems and methods that allow retailers to capture product-specific purchase intent and shopper data for conversion and retargeting. Such novel and unique systems and methods are provided for herein. In some embodiments, the systems and methods provided herein provides a user-directed system and method that allows users to tag particular products they are interested in via the barcode, locate information about the product, allow the user to store specific information about the product (like colors or sizes), add pictures of the product, and save the product on a personal list. Additionally, the system and methods can automatically track inventory and sales status of products on a user "wish list", and provide users notifications about a particular product, for example if it goes on sale, and provide embedded links to purchase the desired products. These systems and methods can be implemented, at least in part, by a mobile application (or "mobile app") that is stored on a user's smart device, for example, a smart phone or other handheld computing device. In some embodiments, the systems and methods can be implemented by users by using built-in capabilities of the vast majority of mobile devices, namely a camera and texting capabilities, without the need for a specific user mobile app, and retailers can track and retarget customers, and provide real-time incentives to consumers.

SUMMARY OF THE INVENTION

In some embodiments, the invention relates to a method of tracking and retargeting product-specific purchasing intent comprising (a) receiving a first multimedia cellular message that includes a digital picture with an image of a machine readable product code and a user device contact identifier that identifies a wireless user device that sent the digital picture; (b) reading the machine readable product code in the digital picture to extract a product identifier indicated by the machine readable product code; (c) searching at least one database for a digital product record associated with the product identifier, wherein the digital product record includes first product data for a first product; (d) storing the first product data in a user-specific digital list, wherein the user-specific digital list is associated with the user device contact identifier; (e) updating a user-specific viewable digital list associated with the user device contact identifier with at least a subset of the first product data, wherein the user-specific viewable digital list is accessible at a user device contact identifier-specific URL and the subset of first product data comprises a product image and product name of the first product; and (f) transmitting a second cellular message to the first wireless user device identified by the first user device contact identifier, wherein the second cellular message includes a first embedded link to the a user device contact identifier-specific URL.

Thus, in this embodiment the received multimedia cellular message can include an image of a machine readable product code, for example, a bar code or QR code or UPC code, and a user device contact identifier, for example, a cellular telephone number of a user smart phone. The machine readable product code is processed and read to extract the product identifier, for example, a UPC code. That UPC code (as an example), can be used to search a database for product data related to the product identified by that UPC code, for example, the product color, product description, product size, etc. The product data can be stored in a user-specific digital list that is associated with the user device contact identifier, for example, the cellular telephone number. A separate, but related, user-specific viewable digital list is also updated with portions of the product data, and that viewable list is accessible at a specific URL (associated with, in this example, the cellular telephone number), with the list having a product image and a product name for the specific product identified by a user. A second cellular message is then sent that includes the embedded link to the user device contact identifier-specific URL, such that if a user clicks on the embedded link, the user-specific viewable digital list will be displayed.

In some embodiments, the invention relates to a method of using a wireless user device to capture and track in-store, real-time, product-specific purchasing intent without downloading a mobile application to the wireless user device, said method comprising: (a) receiving a first cellular message from the wireless user device over a cellular network, wherein the wireless user device has an associated user device contact identifier, and wherein said first cellular message contains the user device contact identifier and a digital picture image of a tag of consumer product comprising a machine readable product code; (b) automatically processing the machine readable product code by a computer system configured to run a code scan application on the machine readable product code to generate a human-readable product identifier; (c) automatically searching at least one consumer product information computer database using the human-readable product identifier, said consumer product information computer database having consumer product records associated with the human-readable product identifier, and retrieving consumer product data associated with the human-readable product identifier, said retrieved consumer product data comprising: (i) consumer product name; (ii) consumer product image; (iii) consumer product price; (iv) consumer product size; and (v) consumer product color, and (d) storing the human-readable product identifier, the user device contact identifier, and the retrieved consumer product data in a user-specific list in a user database; and (e) updating a user-specific viewable digital list associated with the user device contact identifier with at least a subset of the retrieved consumer product data, wherein the user-specific viewable digital list is accessible at a user device contact identifier-specific URL and the subset of retrieved consumer product data comprises a product image and product name of the consumer product; and (f) automatically transmitting a second cellular message over said cellular network to the wireless user device using the user device contact identifier, said second cellular message comprising at least the consumer product name; consumer product image.

In some embodiments, the invention relates to a method of using a wireless user device to capture and track in-store, real-time, product-specific purchasing intent without downloading a mobile application to the wireless user device, said method comprising: (a) receiving a first cellular message from the wireless user device over a cellular network, wherein the wireless user device has an associated user device contact identifier, and wherein said first cellular message contains the user device contact identifier and a digital picture image of a tag of consumer product comprising a machine readable product code; (b) automatically processing the machine readable product code by a computer system configured to run a code scan application on the machine readable product code to generate a human-readable product identifier; (c) automatically searching at least one consumer product information computer database using the human-readable product identifier, said consumer product information computer database having consumer product records associated with the human-readable product identifier, and retrieving consumer product data associated with the human-readable product identifier, said retrieved consumer product data comprising consumer product name; (d) storing the human-readable product identifier, the user device contact identifier, and the retrieved consumer product data in a user-specific list in a user database; and (e) automatically transmitting a second cellular message over said cellular network to the wireless user device using the user device contact identifier, said second cellular message comprising at least the consumer product name and consumer product image.

In some embodiments, retailer-specific promotions and promotion rules can be programmed such that if a user sends in a cellular message about a particular product that is subject to an existing promotion, or later becomes subject to a promotion, the user can be sent the promotion. In some embodiments, when a user first sends a cellular message with a picture of a product tag, the user can be sent the product image and product name. In those embodiments where a user is sent a user device contact identifier-specific URL (e.g., a URL associated with a single cellular number), the URL can also include hyperlinks to a retailer URL where the user can view additional information about the product and/or purchase the product. The data that may be saved and associated with a specific contact identifier can be very specific, even down the size and color of the product. The promotions can also be associated with time limitations and date ranges, for example, sent to a user when a specific amount of time lapses after the original cellular message is sent or only sent over a specific time period. In some embodiments, the method is implemented using a serverless application architecture, performed in server-side logic run in stateless computer containers in response to an event trigger from an event source (e.g., receiving a cellular message).

BRIEF DESCRIPTION OF THE DRAWINGS

To further illustrate the advantages and features of the present disclosure, a more particular description of the invention will be rendered by reference to specific embodiments thereof which are illustrated in the drawings. It is appreciated that these drawings are not to be considered limiting in scope. The invention will be described and explained with additional specificity and detail through the use of the accompanying drawings in which:

FIG. 3 shows one embodiment of a user screen of the mobile application related to scanning of a code.

FIG. 4 shows one embodiment of a user screen of the mobile application relating to the input of a code.

FIG. 22 shows a workflow of the traditional manner of targeting online shoppers.

FIG. 23 shows the workflow of one embodiment of the present invention for targeting offline shoppers.

DETAILED DESCRIPTION

Figure 1:
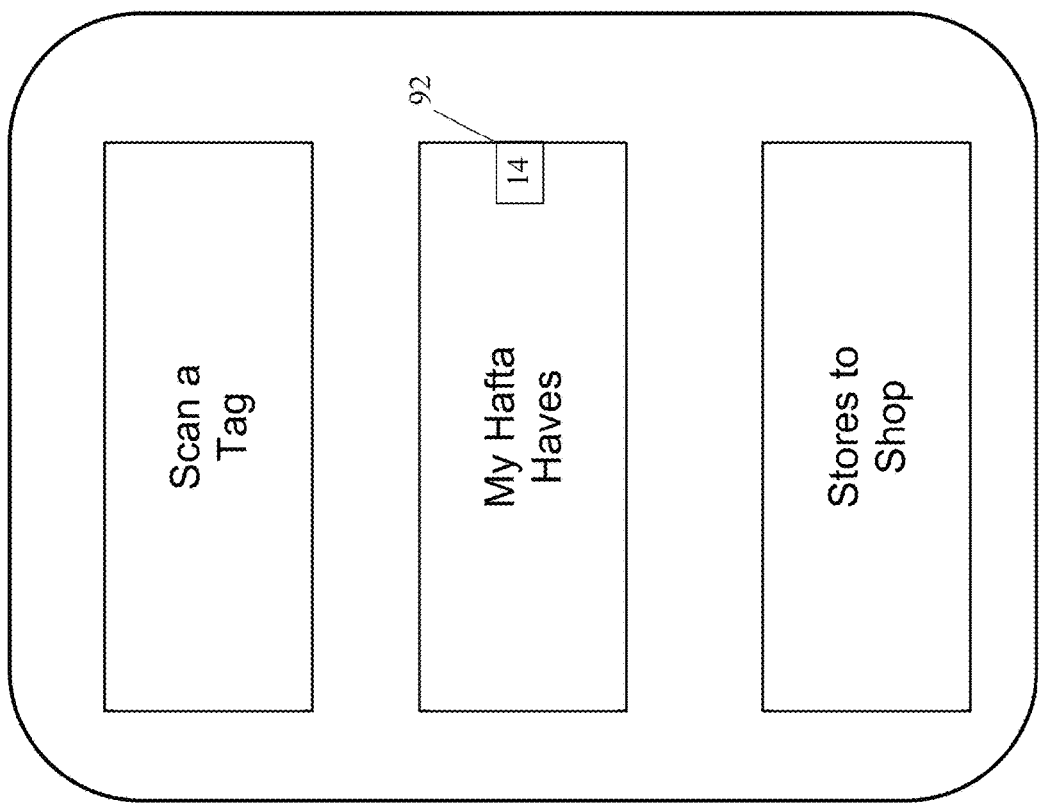
FIG. 1 shows one embodiment of a user screen of a mobile application showing various features and functionality.

The following reference numbers may be used to describe various features, components, or elements of different embodiment of the disclosed inventions:

20 product identifier
22 product information
25 mobile app
30 user database server
35 user tagged database
45 ecommerce/mcommerce platform
50 ecommerce/mcommerce server/database 55 product name
60 product description
65 product images
70 product colors
75 product sizes
80 product price
85 product inventory
90 promotion codes
91 user generated product photos
92 Saved tags notification
93 buy now icon
94 add to icon
98 geolocation identifier
100 computer system
102 portable wireless user devices
104 cellular network
106 computer network
108 servers
110 databases
112 users
114 products (or consumer products)
116 physical retail facilities
118 image of the machine readable product code The present invention solves many of the problems presented by the prior art systems and methods for shopping, and particularly shopping on the Internet. Referring to FIG. 1, one embodiment of a user screen that can be used to implement the disclosed invention is shown. As described above, a mobile app may be downloaded, installed, and stored in the non-transitory memory of a smart device, like a smart phone. When the user seeks to use the mobile app, it is launched, and FIG. 1 shows one exemplary embodiment of a user interface.

The mobile app may have a variety of menus or icons that launch different functionality. FIG. 1 shows three optional functions, namely icons for "scan a tag", "my hafta haves" (i.e., a user's wish list), and "stores to shop". Obviously, additional features and functionality can be added, or some of the displayed icons can be omitted. In use, a user may be in a particular brick and mortar store and locate an item that they are interested in. The user may select the "scan a tag" feature.

Figure 2:
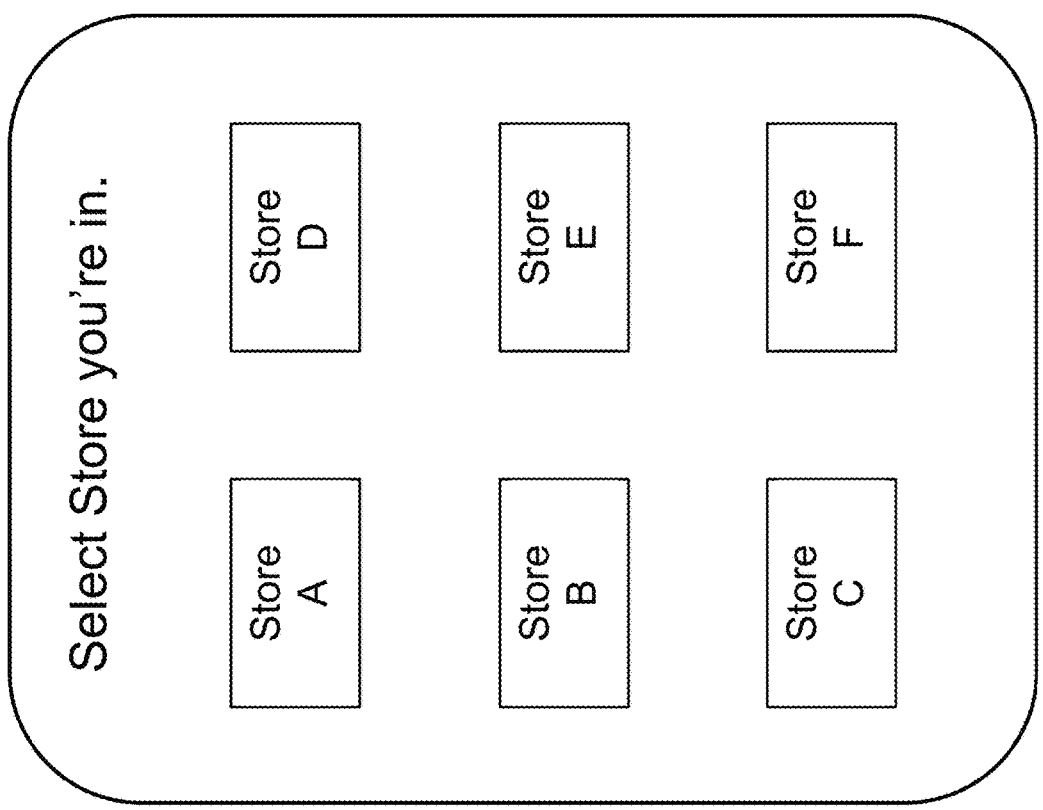
FIG. 2 shows one embodiment of another user screen of the mobile application showing various features and functionality.

As shown in FIG. 2, selecting "scan a tag" may provide another set of user options, for example, a listing of stores, or vendors, that are supported by the mobile app. The stores supported by the mobile app is discussed further below. As example, if the user is in a brick and mortar Forever21 store, the user could select Forever21. Having specific stores to be selected by a user can be helpful because different stores may utilize different types of product identifiers 20 (as discussed further below). The mobile app can utilize the particular store (or vendor) and product identifiers 20, to provide the appropriate information to the user.

Most vendors will mark their individual products with a product identifier 20, often found on the product tag. The product identifier 20 is some type of code, number, or other identifier associated with a particular product that uniquely identifies that product. For example, a product tag could include a reference to "Style No. 34568593", as the product identifier 20. Other product identifiers include online ID, tag numbers, or other codes. Product identifier also includes "machine coded product identifiers", as a particular type and subset of product identifiers 20. "Machine coded product identifiers" are product identifiers that include a machine-readable code associated with a particular product, for example a bar code, QR code, virtual reality code, etc. It is something that is discernable by the human eye, but not readily translatable to useable data by a human.

The product identifiers 20 are utilized by vendors to differentiate the different types of products that they sell. Different vendors associate different information with their product identifiers 20. Commonly, a product identifier 20 may have the following product information 22 associated with it: (1) product name 55 (e.g., XYZ model jeans); (2) product description 60 (e.g., boot cut denim jeans having embroidery on the pockets), (3) product images 65; (4) product colors 70 (e.g., it is available in dark blue, grey, and white); and (5) product sizes 75 (e.g., it is available in small, medium, large, and extra-large, or waist sizes A-B, and lengths C-D). Again, different vendors associate different product information with a product identifier. Other examples of product information may include product price 80, product inventory 85 (e.g., they have the product in inventory or not in inventory, how much is in inventory, where the inventory is located, etc.), and promotion codes 90.

Once the user selects the particular brick and mortar store that they are physically located in (see FIG. 2), the mobile app can launch a screen to capture a product identifier 20. One example is shown in FIG. 3. As shown in FIG. 3, the mobile app launches a function that allows the user to take a picture of a machine coded product identifiers (e.g., a barcode), which is included on the physical tags on many products in the store. If the product has a barcode on the label, the user takes a picture, and the mobile app can process the barcode to determine the product information 22. Another option is shown in FIG. 4, which involves having a user manually enter a product identifier 20 associated with the product. In this case, FIG. 4 shows entry of a style code. This can be used if the image capture of the machine coded product identifier 20 (for example, the barcode) is unreadable, or if the device on which the mobile app is stored does not have a camera. Preferably both options are available, but these two options can be used individually if desired.

While the mobile app may capture the product identifier 20 while in a brick and mortar store off of a product tag, a user may also capture a product identifier 20 in other ways. For example, some e-commerce websites may include the item number of a particular product. Thus, the product identifier 20 viewed by a user on a vendor's e-commerce/mcommerce platform could be manually input by a user. Additionally, some vendors may include a product identifier 20 in print media, for example, a catalog, which can also be utilized.

Figure 5:
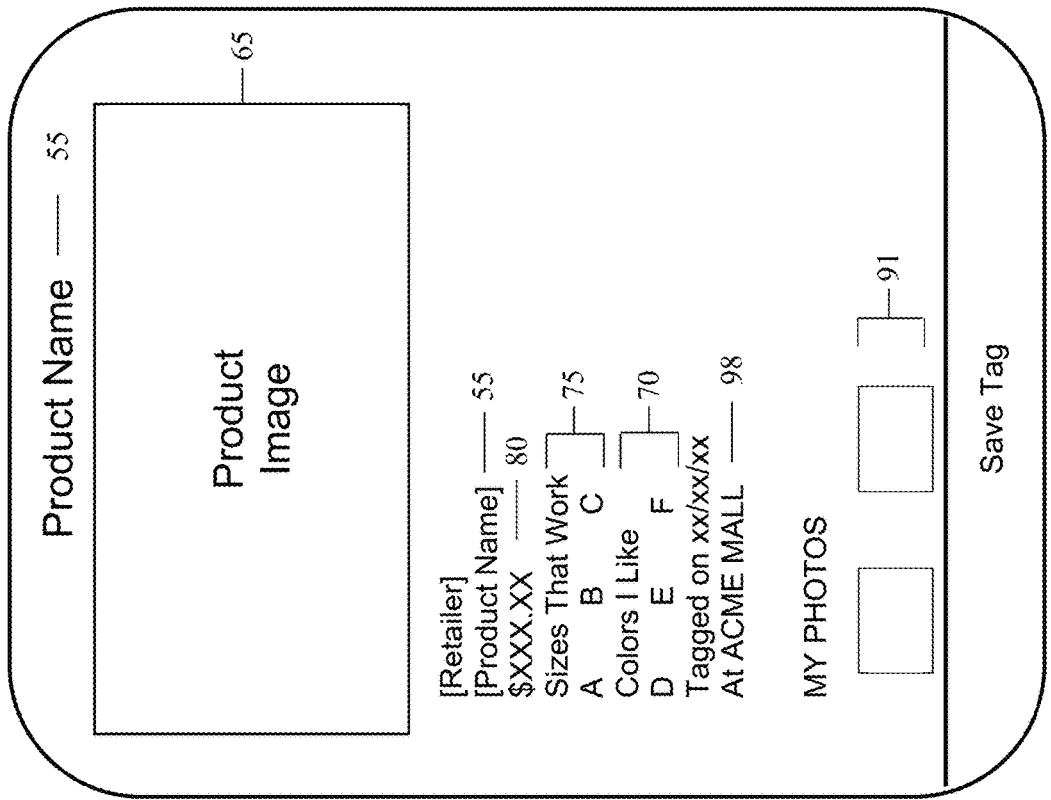
FIG. 5 shows one embodiment of a user screen.

Once the product identifier 20 is captured and processed by the mobile app (or processed by remote servers), the product information 22 can be displayed to the user. One example of a user screen showing product information is shown in FIG. 5. As shown in FIG. 5, the product name 55, manufacturer or retailer name, product price 80, product images 65 (provided by the manufacturer/retailer), product colors 70, and product sizes 75 can be displayed to the user. The user may be provided with a variety of drop down menus or user selectable options. For example, using the product information 22, the user may be provided the option to select, for the sizes available from the manufacturer, the one or more sizes of the item that they prefer (for example, a small or medium). The user may also be provided the option to select one or more colors that they liked. The various product information 22 can be stored on a separate database (for example, a user database server 30) that is in communication with the mobile app using standard technology and systems known to those of skill in the art.

Figure 8:
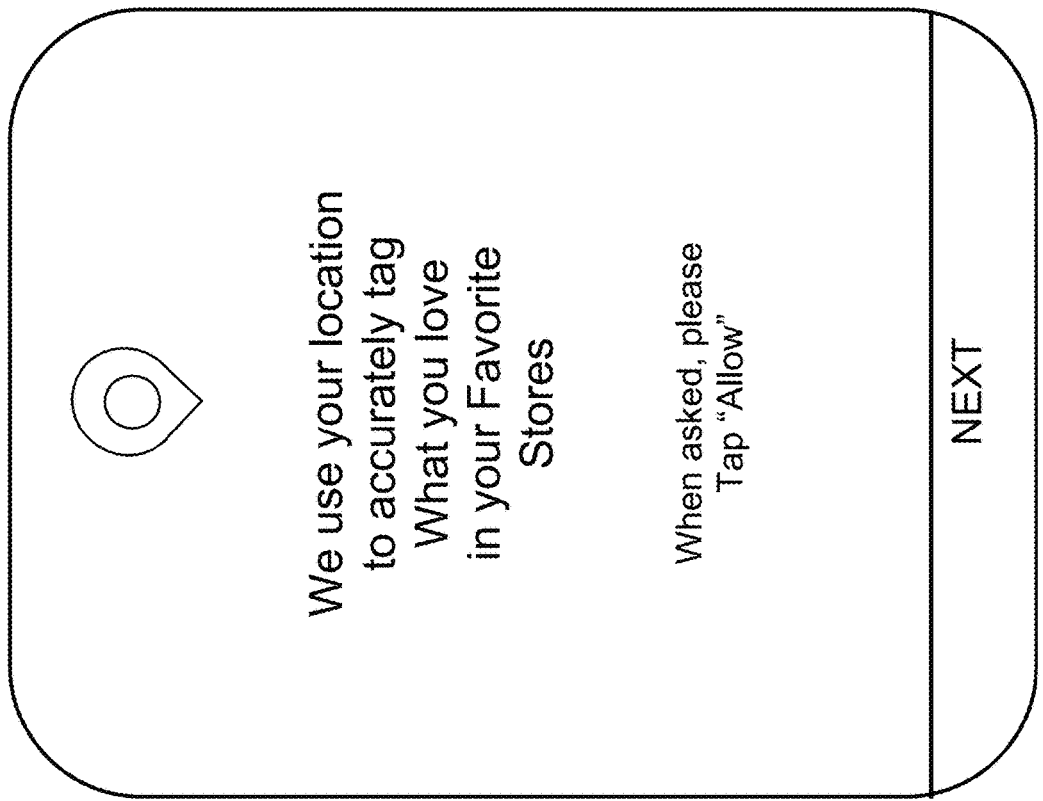
FIG. 8 shows one embodiment of a user screen.

As shown in FIG. 5, the mobile app may also allow utilize geolocation functionality, for example GPS, embedded in the smart device to include a geolocation identifier 98 associated with the product 114 that has been tagged. For example, using the geolocation functionality, when the user captures the product identifier 20, the mobile app can determine, based on the GPS information, that the user is at the ACME Mall. The mobile app may also include the date and time (not shown) that the product 114 was tagged so the user can track when the product 114 was tagged. An example user notification screen related to the geolocation functionality tied to the mobile app is shown in FIG. 8.

Figure 6:
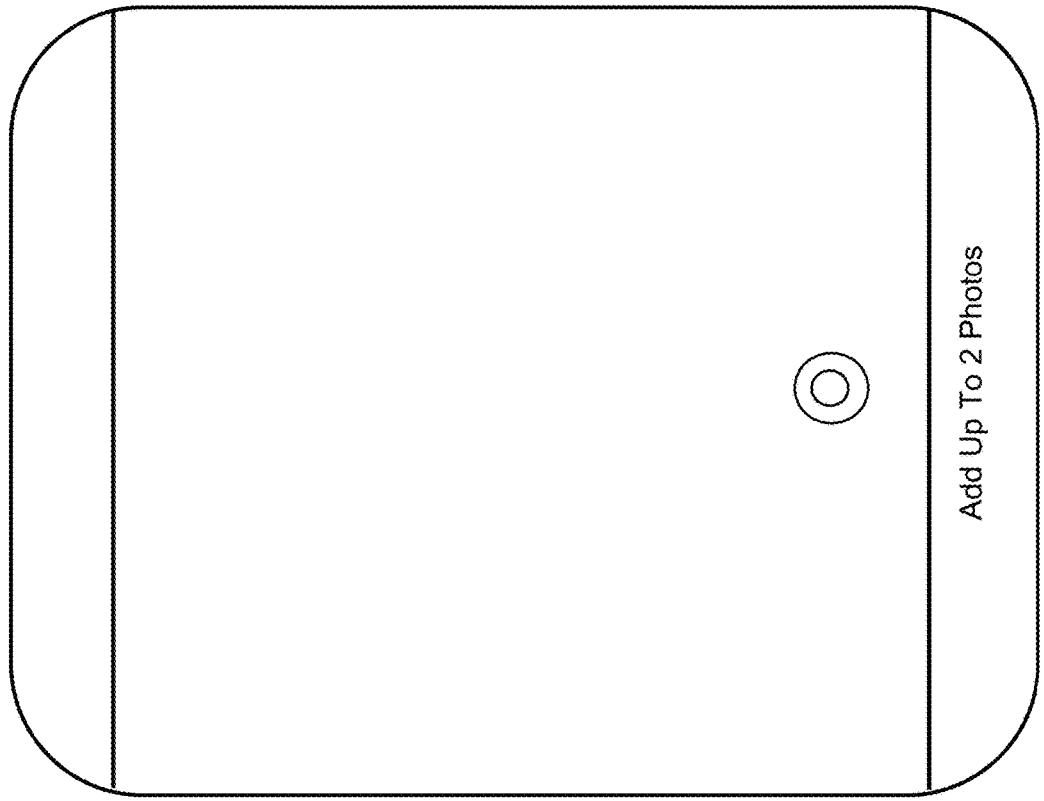
FIG. 6 shows one embodiment of a user screen.
Figure 7:
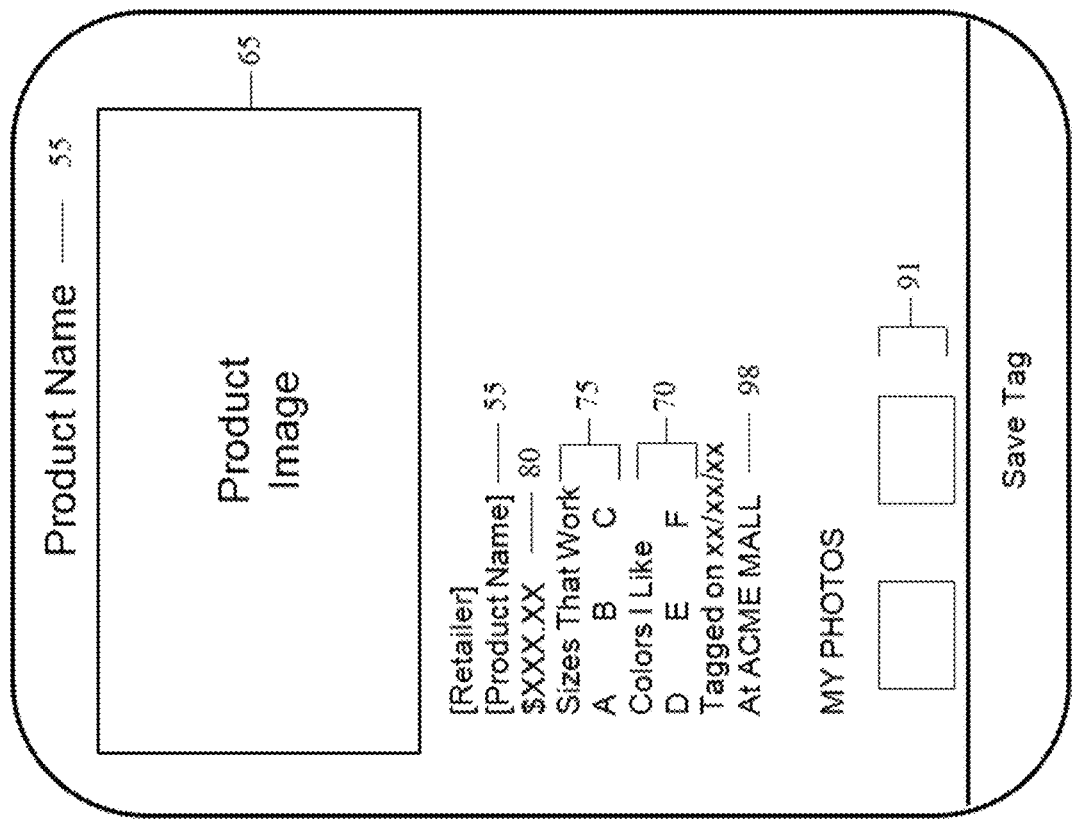
FIG. 7 shows one embodiment of a user screen.

The mobile app may also allow a user to take and upload user generated product photos 91, and store that image for later use. For example, referring to FIG. 5, a user may tap the "my photos" icon, which can launch the smart device's camera application, as shown in FIG. 6. Once the photo is taken, as shown in FIG. 7, the user generated product photo 91 can be associated with the particular product 114 and displayed to the user along with the other product information 22. Unlike the prior art systems and methods, this allows a user to have a user generated product photo 91 of the actual product, or for clothing, a photo of the user wearing the product, so the user can remember how the product looked on them. By associating the user generated product photo 91 with the product information 22, the user has a complete record of the product information 22, when and where they tagged the product *using the geolocation identifier 98), and exactly what the product looked like in person. A notes field can also be provided to allow the user to add any additional information they may want to add.

Once the user has the desired product information 22, and optional photos of the product, the user can choose to "save tag", or save the information for later use. Once saved, the product information 22, and any associated user generated product photos 91, can be stored by the mobile app (and/or provided to remote servers with which the mobile app interacts) and available for later viewing by the user. The saved tags may be viewed by clicking on the "My Hafta Haves" icon shown in FIG. 1. The icon associated with the saved products can also include a saved tags notification 92, showing how many tags have been saved by the user. Any time a user seeks to review information about their saved tags, they can simply select the "My Hafta Haves" icon. This will display the previously saved tags. The user may select what information is displayed for the previously saved tags. For example, all of the product information 22 and the user generated product photos 91 may be displayed for each item, or a user may select to have only the product name 55, price, and manufacturer displayed, or displayed in chronological order, or by location (e.g., geolocation identifier 98), or by price 80, etc. The display options are user configurable through the mobile app.

Figure 9:
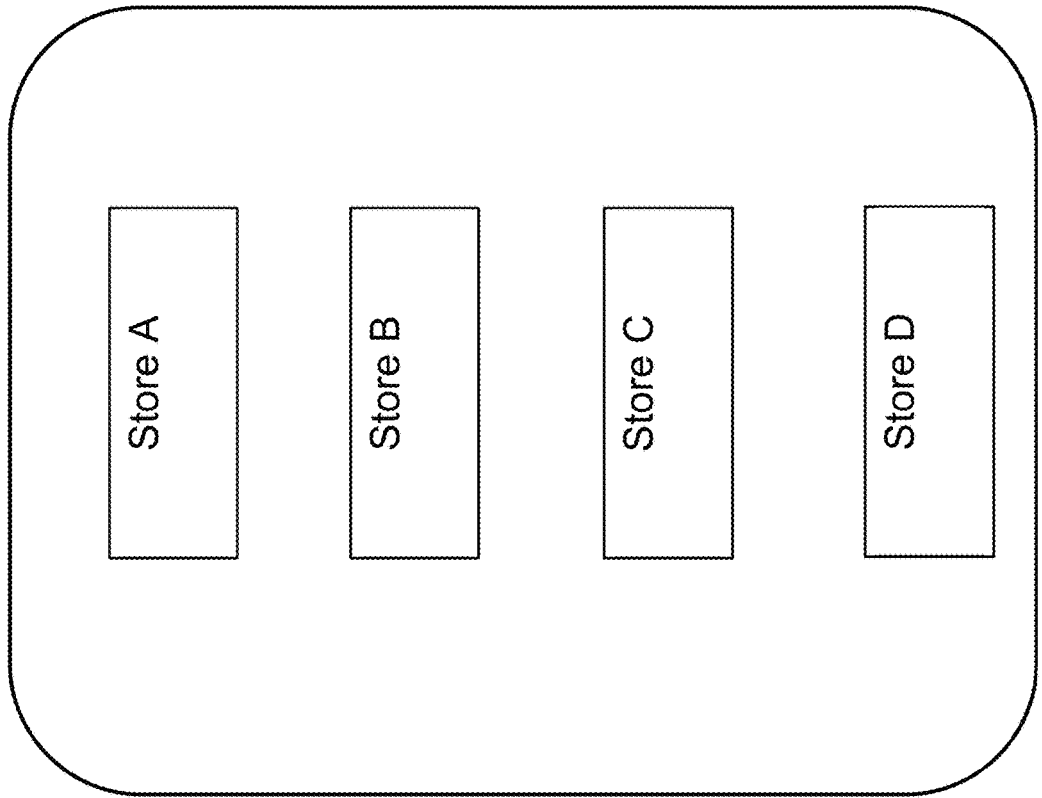
FIG. 9 shows, one embodiment of a user screen.
Figure 10:
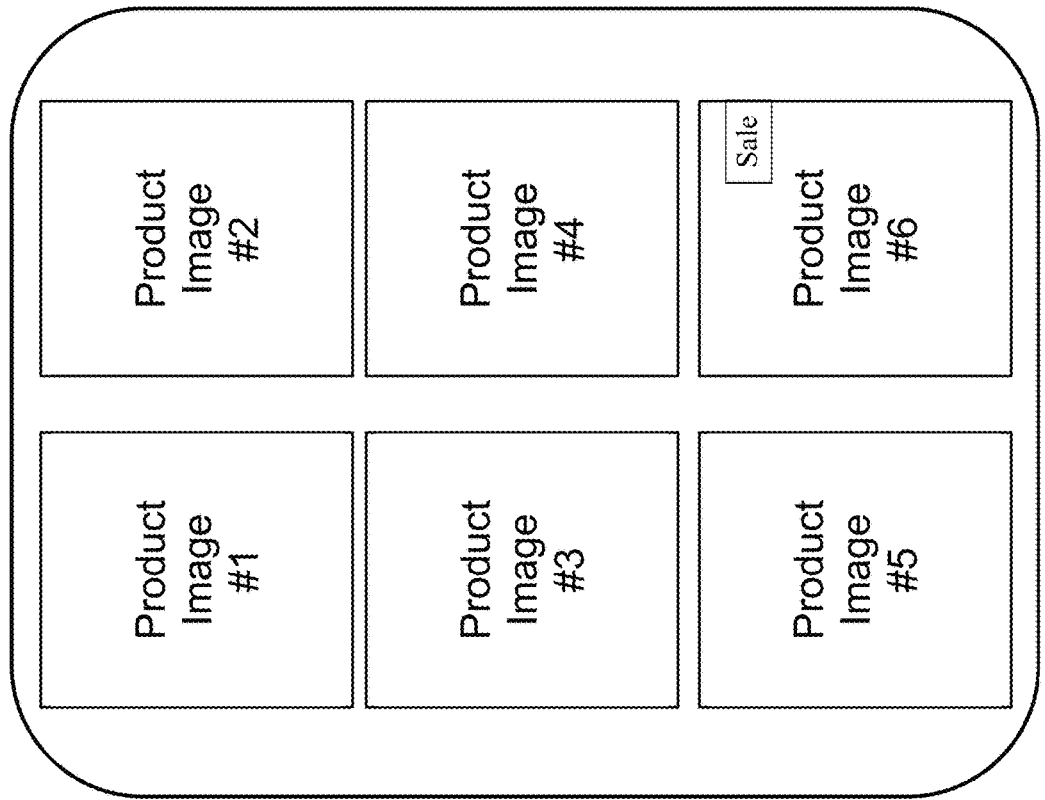
FIG. 10 shows one embodiment of a user screen showing items saved to the user's wish list.

Referring back to FIG. 1, the mobile app may also provide an icon that allows the user to select "Stores to Shop". When selected, the mobile app may provide a user with a list of stores that are supported by the mobile app, an example of which is shown in FIG. 9. Alternative presentations can obviously be used, for example, a presentation similar to that shown in FIG. 2. Once the store is selected, the user can browse items that are available through the selected store, new items, or on sale. The information displayed to the user through this option can be configured by the system (or by the user, for example, using drop down menus) so that users are only presented with certain items, for example items on sale, or new items added within some time period. Additionally, the information displayed by the user may be configurable by the user, for example, the user may only want to see women's shirts that are on sale. An example user screen showing the browse options is shown in FIG. 10. The browse options displayed from the mobile app are stored on the mobile app platform, and obtained from the particular vendor/store's e-commerce/mcommerce platform, or from a separate database that is in communication with the mobile app using standard technology and systems known to those of skill in the art. By doing so, the user may browse between different stores, all within the mobile app. In other words, the user is not required to go separately to the Anthropologie website or mobile app, the Free People website or mobile app, the Forever 21 website or mobile app, etc.

Figure 11:
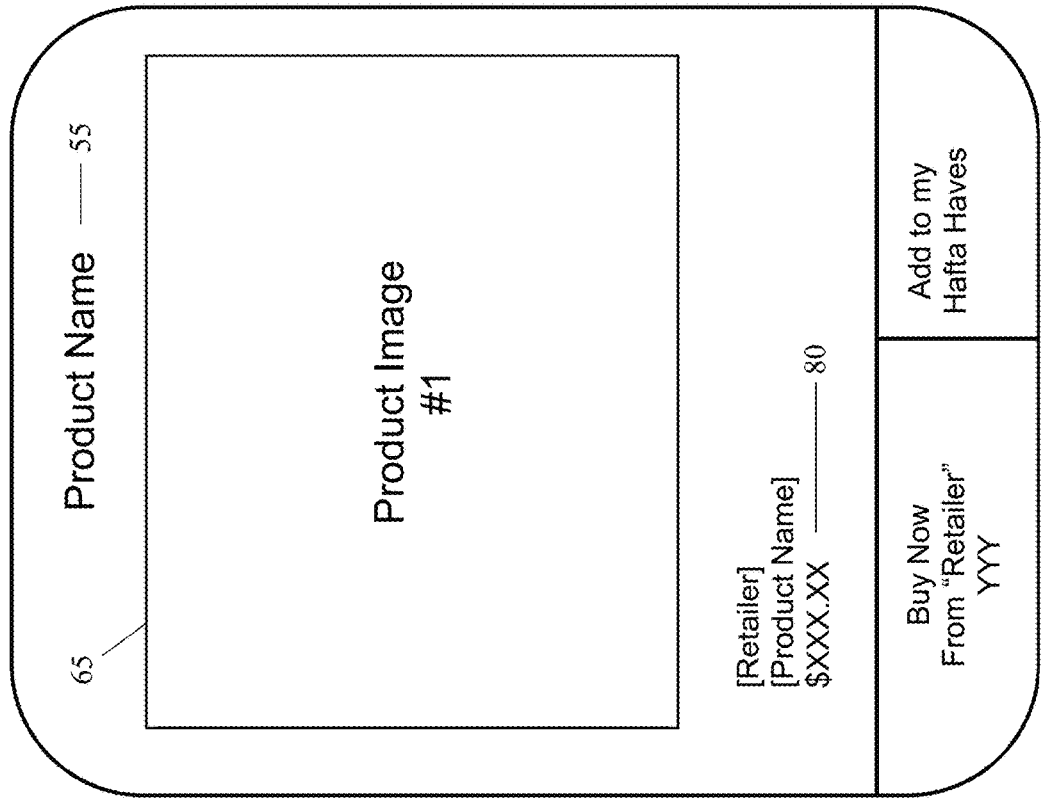
FIG. 11 shows one embodiment of a user screen showing an item selected off of the user's wish list shown in FIG. 10.

An additional advantage of having all the different store's data in one place is shown in FIG. 11. While browsing a particular store (as shown in FIG. 10), if a user selects a particular item, the user can be provided a variety of options. For example, a user can select a "buy now" icon 93. The buy now icon 93 can have an embedded link that will automatically redirect the user to the particular store or vendor associated with the product, and preferably the link to where the user can purchase the product on the store or vendor's ecommerce/mcommerce platform 45. Additionally, as shown in FIG. 11, a user can select the "add to" icon 94, which can allow the user to tag the particular items a described above. While tagging a product from the "Stores to Shop" functionality will normally not include a user generated photo (unless one has been stored from a prior visit to a brick and mortar store for this product), it will still allow the user to save the product information 22 related to the product to the user's "My Hafta Haves". By structuring the present system and method to capture all this information to make it available in a single place, the Applicants have solved an Internet-centric challenge, allowing users to directly link to a vendor's website or e-commerce platform for purchase, while at the same time allowing users to save the product information for potential later purchase.

Figure 12:
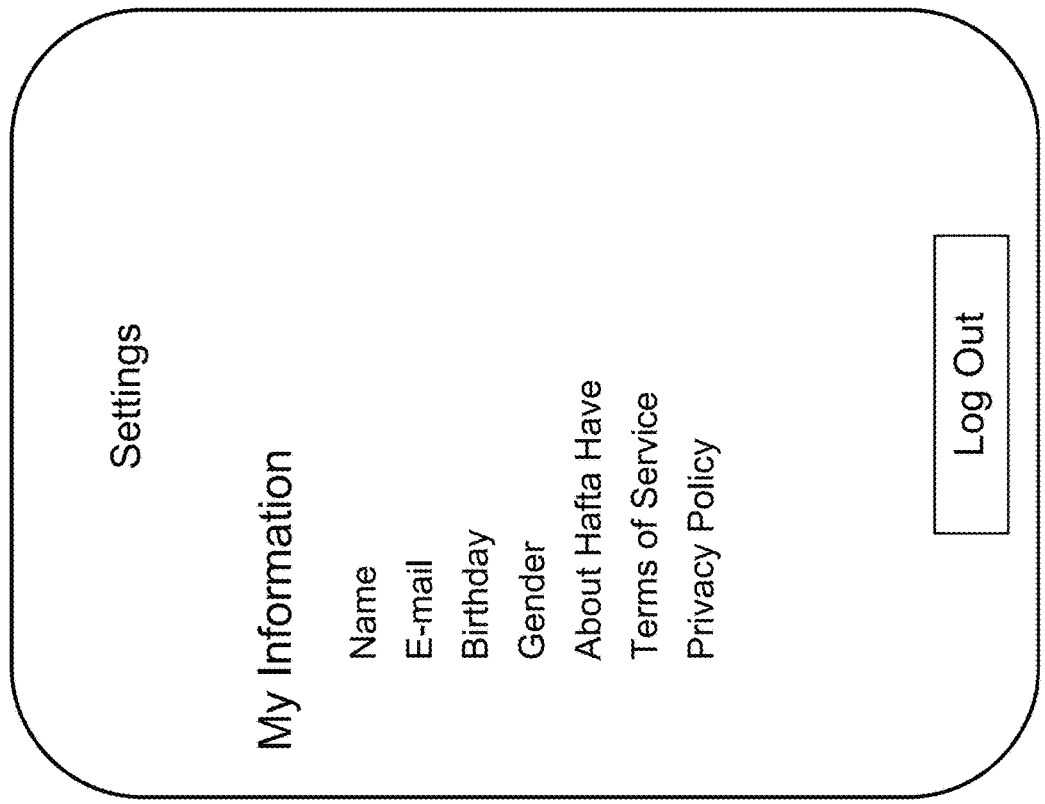
FIG. 12 shows one embodiment of a user screen for a user to provide certain personal information.

A sample user screen that may be filled out by a typical user is shown in FIG. 12. As shown in FIG. 12, the mobile app may allow a user to provide their name, email address, birthday, and gender. Other information can be associated with a particular user and user profile, including the user's mobile phone number, store preferences, notification preferences, preferences on certain styles, colors, sizes, location (or address), etc. The user profiles can be stored as part of the mobile app itself, or the user database server 30, or both.

Figure 13:
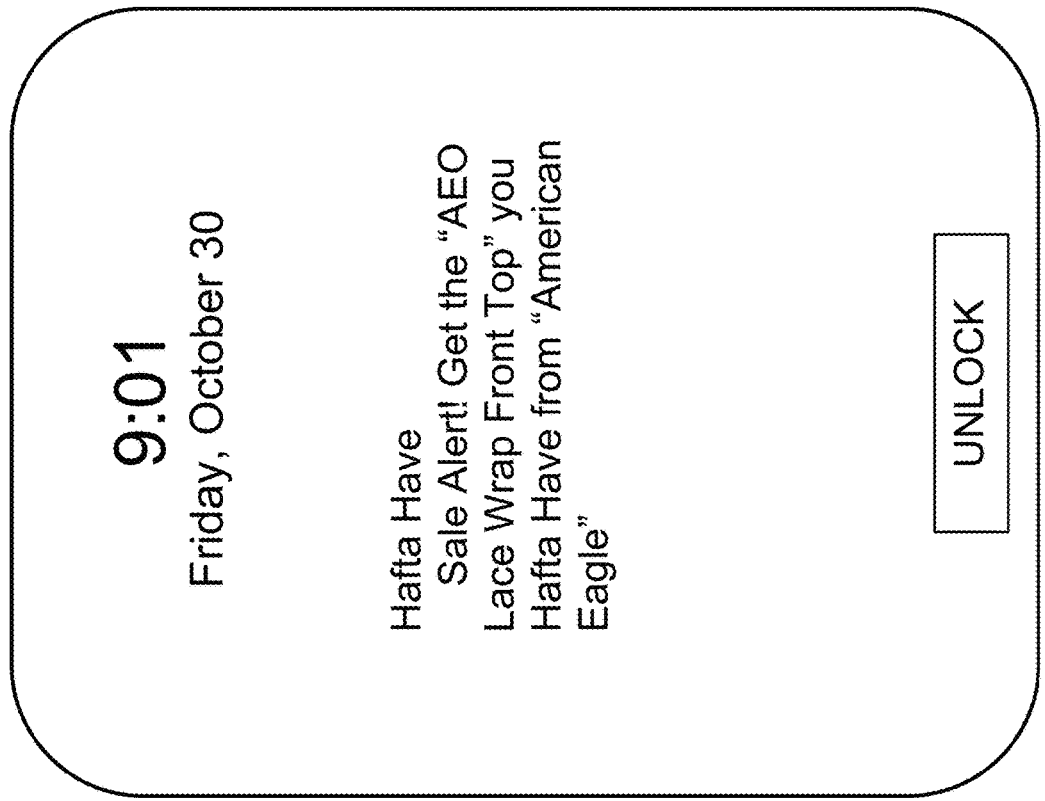
FIG. 13 shows one embodiment of a user screen showing notifications that can be provided to a user.
Figure 14:
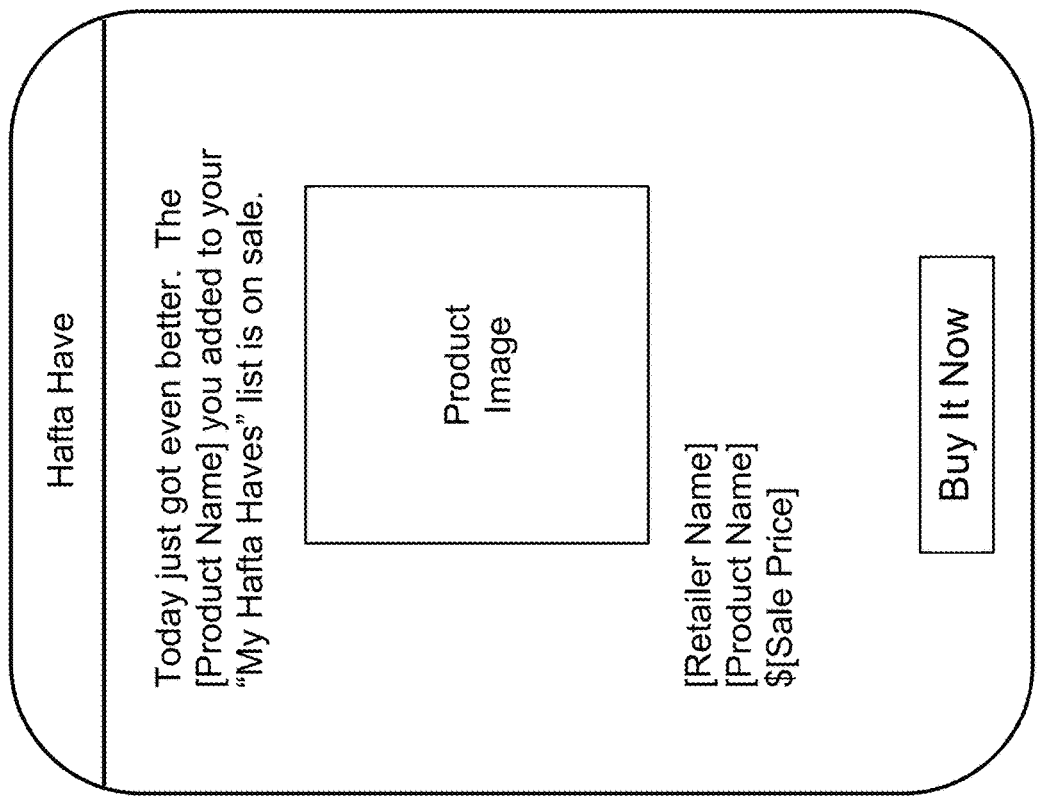
FIG. 14 shows one embodiment of a user screen presented to a user when an item saved to the user's wish list has gone on sale.

Another advantage of some embodiments of the present invention relates to notifications to mobile app users, across multiple platforms. As described further below, the system may crawl the e-commerce/mcommerce platforms 45 and ecommerce/mcommerce server/database 50 of the stores supported by the mobile app for the most updated information on the products available from the particular store (or vendor). The crawl can be done periodically (for example, daily), or constantly. The system can maintain its own database of the products, product identifiers, and associated product information for the same products made available through the store's e-commerce/mcommerce platform. Additionally, the system is specially programmed to compare information from the store's e-commerce/mcommerce platform against users' stored tags in the user tagged database 35, or "My Hafta Haves" described above. If there is a change or update related to a product (for example, it went on sale, or there has been a change in the inventory, colors available, or sizes) that has been tagged by a particular user, the user may automatically be provided a notification. The notification can be provided via an email to the user's email address, through the mobile app, in the form of a text notification, or even by recorded message to a user's phone. An example text notification relating to a particular tagged product (i.e., a product that was been stored to the user tagged database 35) going on sale is shown in FIG. 13. An example email notification relating to a particular tagged product going on sale is shown in FIG. 14.

Figure 15:
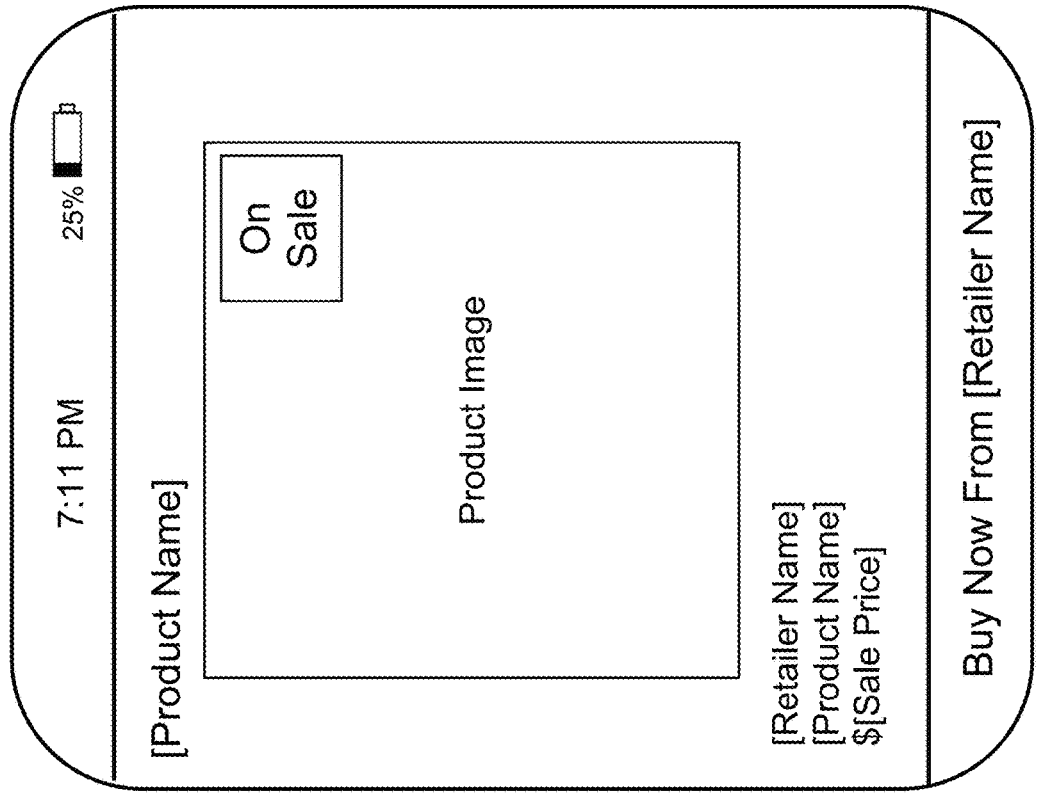
FIG. 15 shows another embodiment of a user screen presented to a user when an item saved to the user's wish list has gone on sale.

In some embodiments, the notification to a user may include an embedded link that redirects the user to more information about the product which triggered the notification, or to a screen where the user can buy the product. As an example, if the notification shown in FIG. 13 is tapped, the user may be redirected to a screen similar to that shown in FIG. 15. The image shown in FIG. 15 is still within the mobile app platform. The display can provide any set of the desired production information 22, for example, the product name 55, manufacturer (or store), and the price 80, both original and sales price. As shown in the sample email notification of FIG. 14, the user may also be presented with a "buy it" icon, which, if selected, can include an embedded link which can redirect the user to a screen similar to that shown in FIG. 15. Alternatively, from any notification, if selected, the user could be redirected by the embedded link directly to the e-commerce/mcommerce platform 45 of the particular store/vendor to allow the user to purchase the item.

Figure 16:
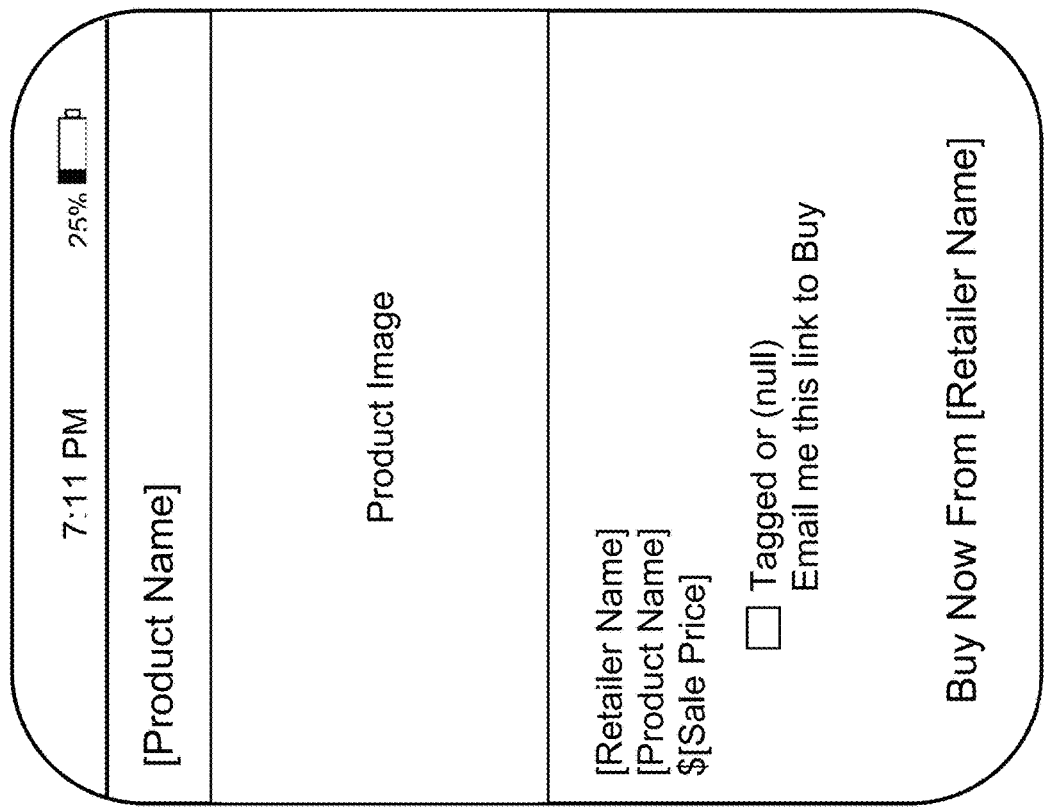
FIG. 16 shows an alternative view of a partial user screen presented to a user when an item saved to the user's wish list has gone on sale.

As shown in FIG. 16, users may be provided additional options associated with any notifications. For example, users of the mobile app may be provided with the option to email the link to buy the product to the user, remove the item from the list of products they are tracking (e.g., remove from the user's "My Hafta Have"), or designate that the user has already purchased the product.

In some embodiments, the system and method includes a few basic components to solve some unique and internet-centric problems. The components can include a product identifier 20, a specially programmed mobile app 25 for capturing and transmitting a product identifier 20 through the internet to a user database server 30, one or more vendor e-commerce/mcommerce platform(s) 45, and an e-commerce/mcommerce server/database 50.

The product information 22 associated with a product identifier 20, and product identifiers 20 themselves, may be stored and maintained in non-transitory memory in a variety of places. The product information 22 and/or product identifiers 20 may be stored on the e-commerce/mcommerce platform 45, e-commerce/mcommerce server/database 50, the mobile app 25, etc. As an example, a particular vendor may have an e-commerce/mcommerce server/database 50 that maintains all of the vendor's inventory in hundreds of different locations, along with all of the other associated product information 22. Rather than store all of that data on the e-commerce/mcommerce platform 45 that is accessed and used by users, it may configure their systems such that the e-commerce/mcommerce platform 45 is in communication with the e-commerce/mcommerce server/database 50, and able to provide the necessary information for a particular user search or request.

In some basic embodiments, the first step involves a shopper (also referred to herein as a user) locates a particular product that they like. In the next step, the user finds the product identifier 20. In the next step, the user inputs the product identifier 20 in to the mobile app 25. The mobile app 25 resides on the user's smart device, for example a smart phone. The mobile app 25 may have a variety of user interfaces that allow a user to accomplish this step. As examples, the product identifier 20 is input via camera scanner, voice input, or manually input. As is well known, most mobile devices, like smart phones, have an incorporated camera. Using conventional methods, known to those of skill in the art, the mobile app 25 allows the user to take a picture of the product identifier 20, and automatically determine the associated product information 22 (via an inquiry through the internet, the user database server 30, and/or to the e-commerce/mcommerce platform 45 and/or e-commerce/mcommerce server/database 50). The mobile app 25 may include OCR capability to read and interpret the image and convert the image into machine readable text. For example, if the camera captures an image of "Style No. 34568593", it can convert the image into "34568593" and utilize that as the product identifier 20.

Similarly, the app 25 can include conventional methodology to allow the user to speak a particular number or code (as the product identifier 20) and convert the spoken words into text for use as the product identifier 20. Alternatively, the mobile app 25 may provide a manual input screen to allow the user to type in the product identifier 20.

In the next step, the mobile app 25 processes the input product identifier 20 and displays the product information 22 associated with the product identifier 20 to the user. The user may save the tagged product to the user tagged database 35 (to later receive notifications about the product) or be directed to where the user can purchase the product.

While many shopping apps may exist, use of apps stored on a mobile device (like a smart phone) has a number of drawbacks. For example, unless preloaded on a mobile device, apps must be downloaded to the mobile device (e.g., smartphone). Additionally, many apps require a user to log in to use them, often requiring a user name and password. Furthermore, many older users are uncomfortable using mobile apps at all, or downloading apps, and are often limited to the most basic mobile device capabilities like taking pictures, and sending text messages. Apps also take up memory on the mobile device, limiting available memory for other apps, music, videos, etc. Apps may also take some time to load and run, and also add extra drain on the mobile device's battery. Additionally, for those apps that require or rely upon data exchange with a remote server, the apps require internet access to take full advantage of the app capabilities.

Thus, in some embodiments of the present invention, Applicant provides a technical solution to many of these technical problems. Specifically, Applicant has developed systems and methods using some built-in mobile device capabilities, and combining them with unique processes in a unique way that still allow customers to save items they've found in a store and on which they want to receive notifications about without use of a separate mobile app, and yet still allow retailers to capture product-specific purchase intent and shopper data for conversion and retargeting.

In one of the most basic embodiments, a user takes a photograph of a product tag using a portable wireless user device, like a smartphone. The tag has a machine readable code product identifier, and also referred to herein as machine readable product code (like a bar code, QR code, etc.). The user then transmits the digital photograph of the tag (or a portion thereof) to a separate tag reader system which extracts and reads the machine readable code product identifier contained in the photograph to identify the product. The digital photograph is preferably sent via cellular message so that internet access is not required. Various types of cellular message systems and formats can be utilized, including but not limited to SMS, EMS, MIMS, instant message, messenger platforms (for example, Facebook messenger) and email. As is known, to send a cellular message, the user enters a destination contact identifier (e.g., an address to which the message is sent). The destination contact identifier can be a basic telephone number or a short code (see, as an example, FIG. 26). Sending a cellular message with a digital photograph is sometimes referred to herein as a "multimedia cellular message." The portable wireless user device may automatically include other data with the multimedia cellular message including a user device contact identifier (e.g., a telephone number) that identifies the portable wireless user device sending the message, location data that identifies a location where the digital picture was taken (like a geolocation identifier 98, discussed above), a date that the digital picture was taken, and a time that the digital picture was taken.

One benefit of this approach is that it takes advantage of the built-in capabilities of almost every relatively recent portable wireless device, e.g., cameras and SMS capability (as an example). Thus, no additional apps or special functionality is required on the user side. Other benefits are that it does not require launching any app, signing into any app, it does not take up additional memory in the mobile device, and it does not require internet access to operate. Since it utilizes cellular messages for transmission, it simply requires access to a cellular network, which are much more prevalent than internet access. It also reduces processing power of the phone and utilizes much less battery power.

As described above, the tag reader system at a remote location receives the photograph of the tag containing the machine readable code product identifier, and extracts and reads the machine readable code product identifier contained in the digital photograph to identify the product identifier 20. The tag reader system utilizes commercially available software and hardware known to those of skill in the art to extract and interpret the necessary information to identify the product identifier 20, for example by bar code, style code, etc. This information may be converted to a UPC code if it is not included in the original picture, or not extractable from the photo. The tag reader system, or a separate system, can then obtain the necessary product information 22 from other databases that have the necessary product information 22 associated with the particular bar code, UPC code, or other product identifier 20 as described above.

When a user transmits this type of message to the system, the user's phone number (also referred to herein as a "user device contact identifier") is associated with the product information 22 (for example, name 55, size 75, color 70, etc.). Additional information like the zip code or other location of the user can be provided (through geolocation or GPS functionality). In some embodiments, the user information captured through the basic receipt of the text message can be cross referenced against other information, platforms, and database in order to provide more information about a user. For example, the system could search a list of users of the mobile application to see if this telephone number is also associated with a particular user name, address, location, etc. associated with an app users. Alternatively, or in addition, the system may search social network platforms, like Facebook, or retailer databases, to try to determine additional information about the user.

This technical implementation and technical approach also eliminates the need to incorporate a bar code scanner application onto the wireless user device, or to embed other bar code scanner functionality into an app. This approach can also eliminate the need for having a mobile app loaded onto the wireless user device at all.

In one embodiment, a consumer can capture a product identifier 20 and send that to a user database server 30, for example by taking a picture of a product tag and texting it to a predesignated number, including a short code. The picture may be transmitted by message service, like SMS, MMS, or other alternative. The user database server 30 can look up the product information 22 related to the product identifier 20 (as discussed above) and the user, and can begin tracking the product. It will be recognized by those of skill in the art that in describing different systems and servers, for example, inventory system, user database server 30, user tagged database 35, and e-commerce/mcommerce server/database 50, these various servers and the associated functionality may reside on a single system or in a distributed environment.

Figure 17:
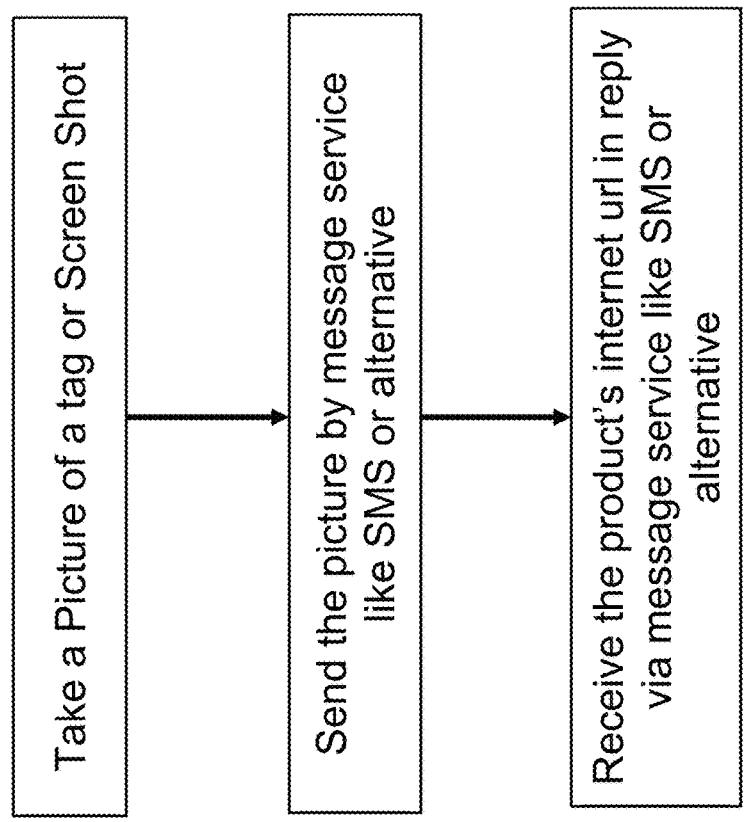
FIG. 17 shows an exemplary workflow of one embodiment of the invention.

In this context, providing the information related to a particular product can be an automated process that can read and interpreted from the product identifier 20 (e.g., a bar code), or it can be an individual that views the information transmitted by the consumer, and looks up the product information, or a combination of the two. Once the product identifier 20 is adequately captured, a link to the product information can be determined (e.g., a URL that often includes product information 22, for example, sizes 75, colors 70, cost 80, and/or ordering information), and the user can be provided with the product information 22 via message service like SMS or other alternative. The information associated with a particular product can be stored in the e-commerce/mcommerce server/database 50, or other database. An example workflow as described above is shown in FIG. 17.

Figure 18:
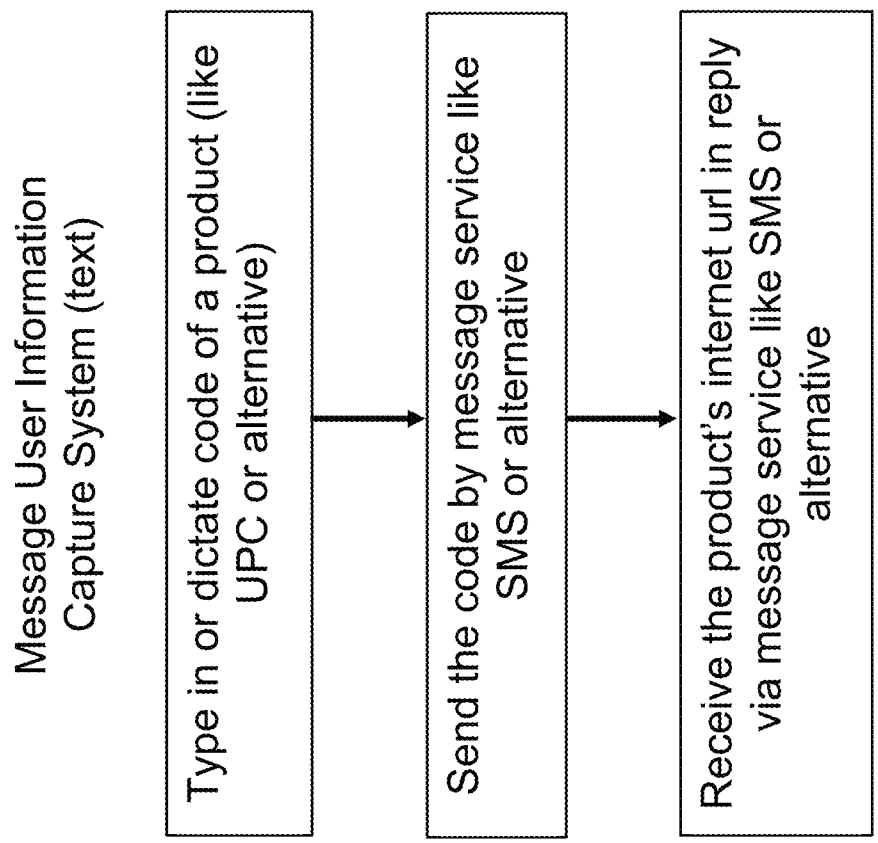
FIG. 18 shows another exemplary workflow of one embodiment of the invention.

In some embodiments, rather than sending a picture, the consumer can type in or dictate a product identifier 20, like a UPC or alternative. That product identifier 20 can be transmitted by message service, like SMS or using another alternative. Once that UPC code is captured, the same link to the product information 22 can be provided to the user. In some embodiment, a user may send a picture and text identifying a product. An example workflow as describe above is shown in FIG. 18.

One distinct advantage of the present system and methods is that very specific targeting can take place because the system has been able to associate very specific product information with a user, including things like color and size. In most cases where a user is simply browsing products on a retailer's website, retailers do not know what particular color or size a shopper may want or need. Additionally, sometimes only a particular size or color of a product will go on sale. Thus, being able to target specific shoppers, down at a granular level with specific sizes and colors, allows much more valuable retargeting of consumers.

The information described above can be saved in a database, and tagged to a user-specific list (for example a user tagged database 35). The user-specific list is associated with the telephone number (i.e., user device contact identifier) from which the message was received. For example, a particular user may send a message with the pictures of tags for three dresses, two shirts, and a pair of shoes, which was saved on a personal list associated with the particular telephone number. This valuable information can be shared with retailers signing up for the system and methods disclosed herein, e.g., providing in-market audiences to the retailer. The system allows for retargeting of offline shoppers, allows cross-device reach, and provides dynamic, product-specific promotions.

Figure 19:
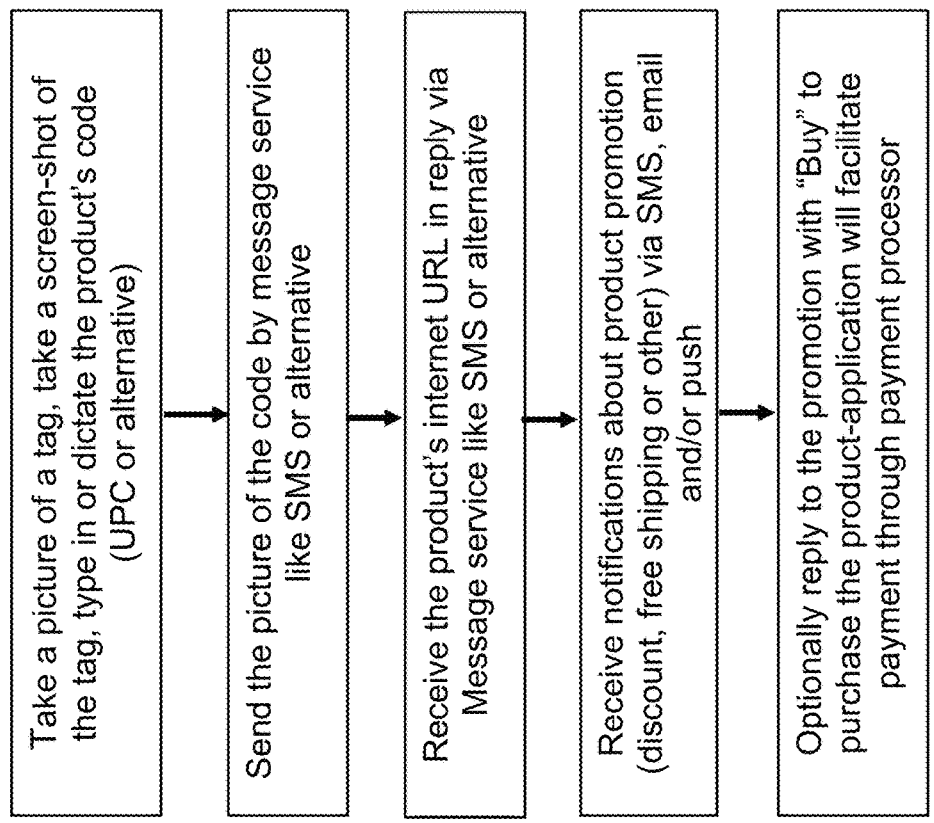
FIG. 19 shows another exemplary workflow of one embodiment of the invention.
Figure 20:
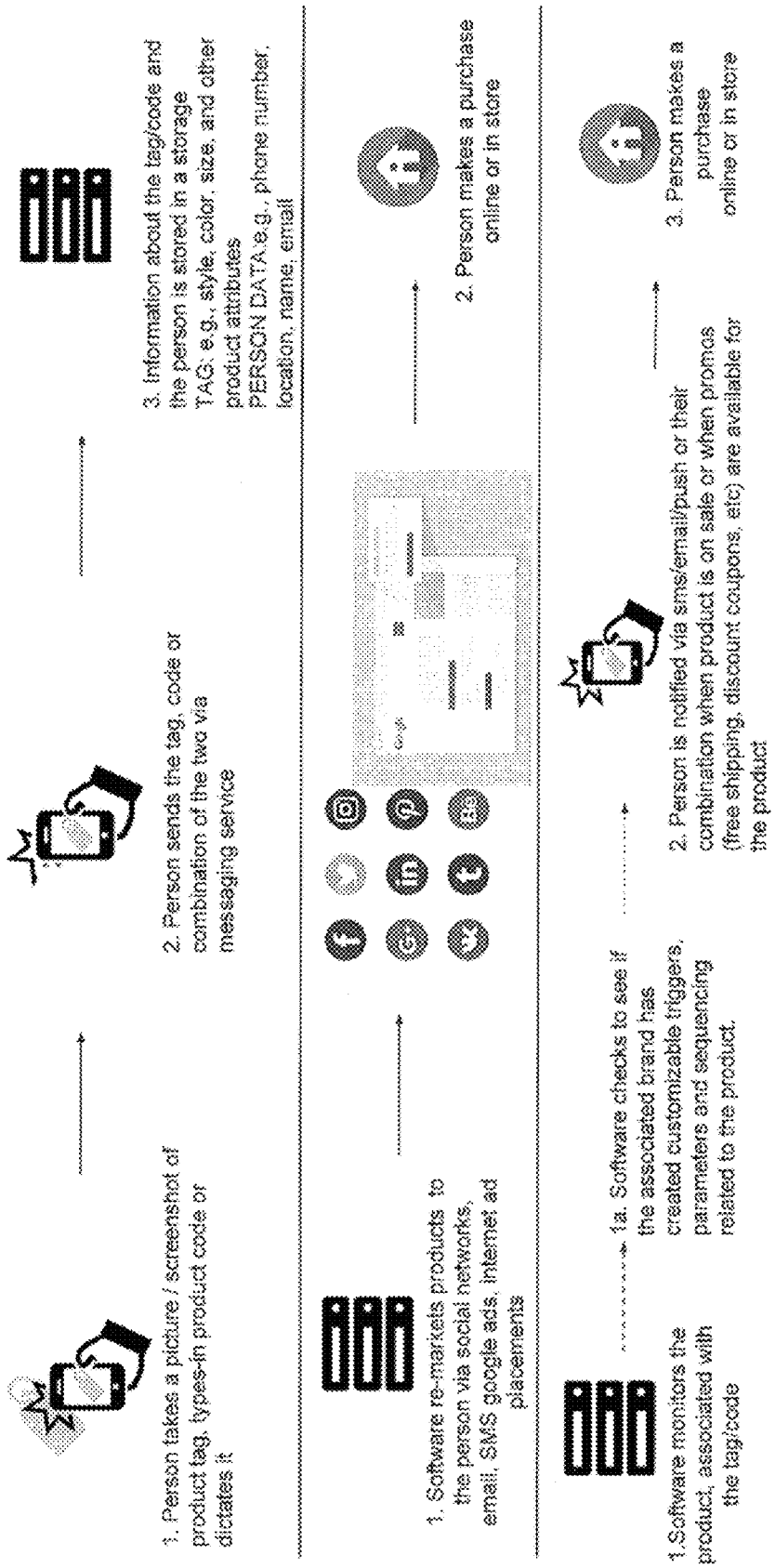
FIG. 20 shows an exemplary embodiment of a workflow for remarketing for offline stores.

With the consumer's desired product information saved, the consumer can be notified by the system's administrator, or the retailer which has access to this information, of various promotions related to the products saved to the user's wish list. For example, if the specific product saved to the user's wish list goes on sale, the consumer can be notified as described above (for example, via SMS message). Additionally, the consumer can be provided with coupons or savings related to the specific product, or to a retailer generally (e.g., 20% off any $100 purchase, or free shipping). Notifications to user can be via SMS, e-mail, push messages, or other alternatives. The user may optionally reply to any promotional message with CVV or credit card to purchase the product. An example workflow as described above is shown in FIG. 19. Another example workflow for retargeting and/or remarketing for offline stores is shown in FIG. 20.

Figure 21D:
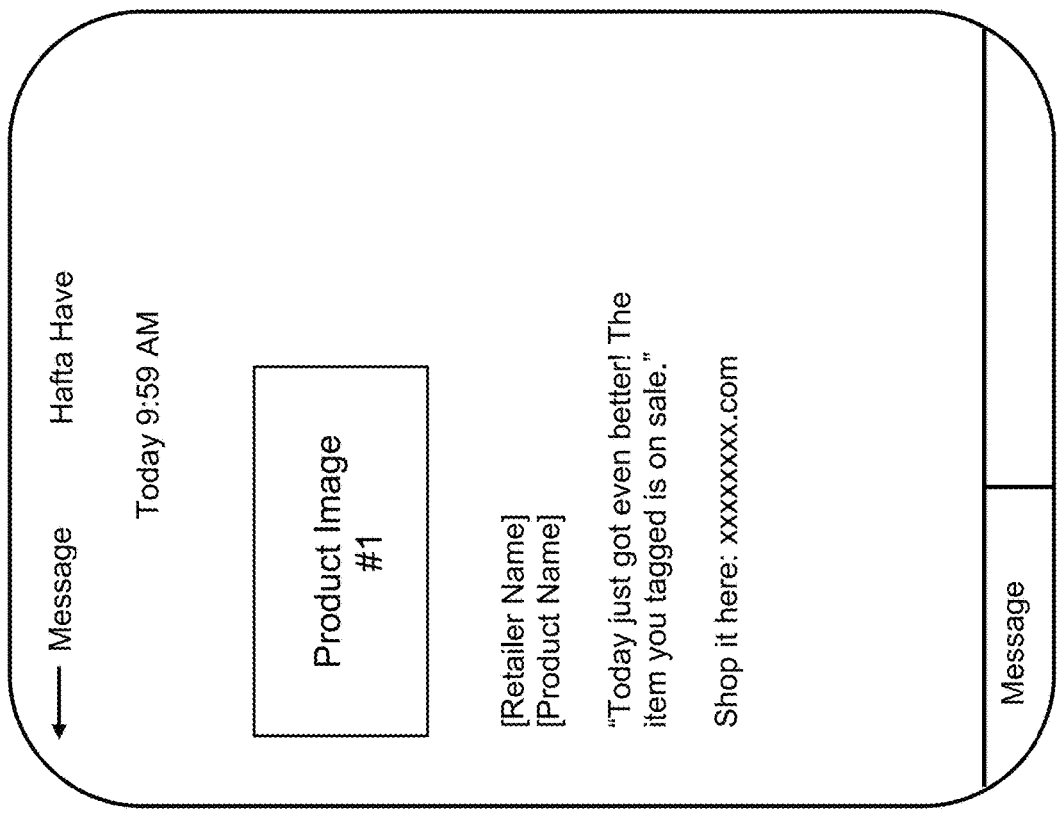
FIG. 21(*a*)-21(*e*) show a series of screen shots depicting different aspects of one embodiment of the invention.
Figure 21C:
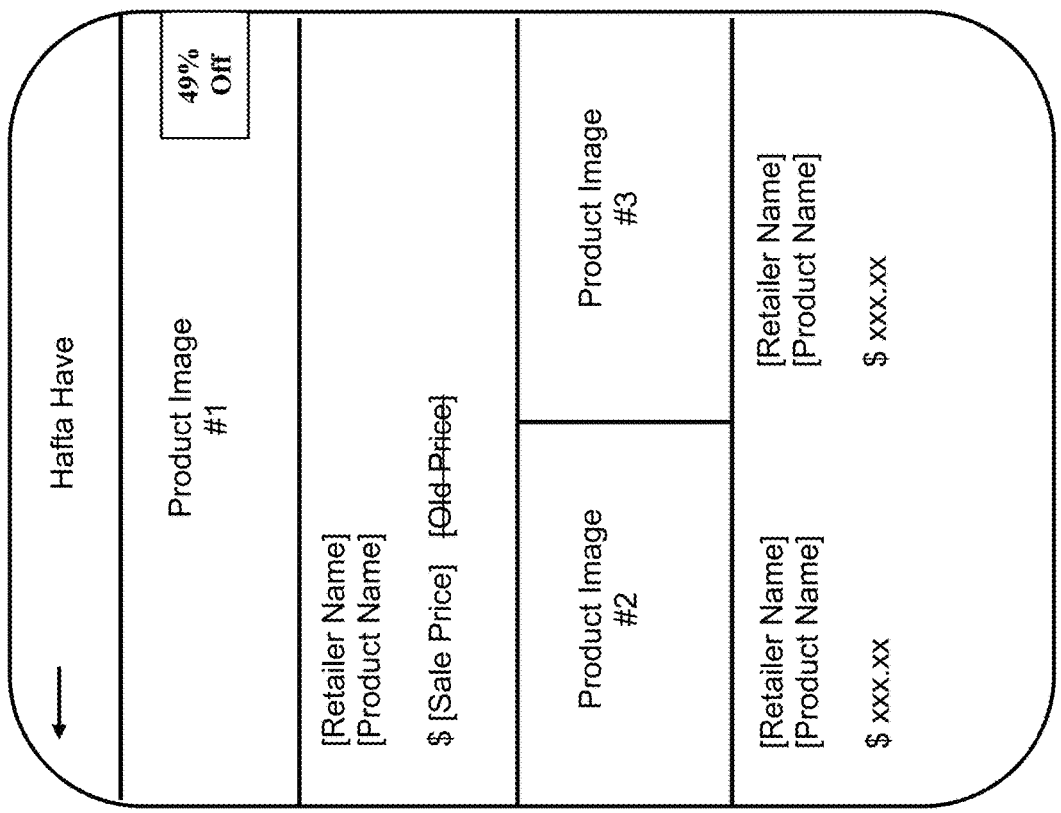
Figure 21E:
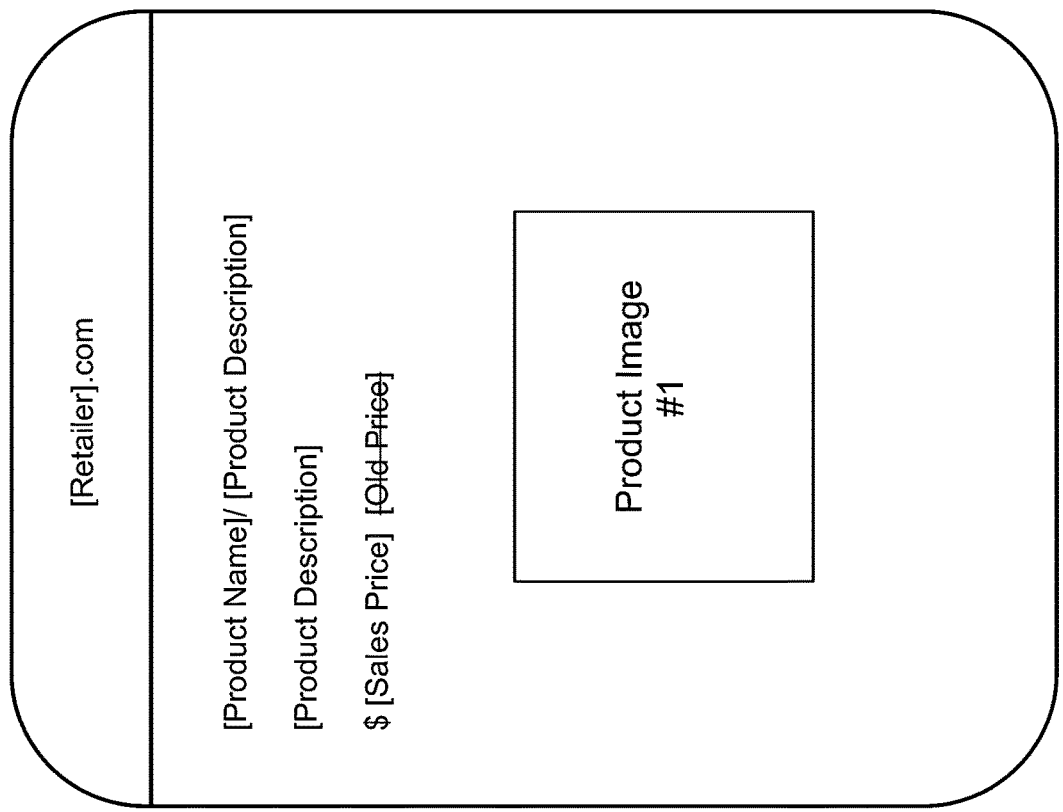

A series of screen shots and workflow is also shown in FIGS. 21(a)-(e). In the first screen shot of FIG. 21(a), a user has taken a picture of a tag, and texted it to a particular designated number ("destination contact identifier"). The response from the system is shown to the left side of the screen telling the user that the product has been saved to their list, and that the user will receive information about savings and exclusive offers. A picture of the product and some basic product information 22 is provided to the user, and a URL is provided that links the user to all of the items that have been saved and associated with that particular user. The second screen shot shown in FIG. 21(b) provides a similar update by a user sending additional pictures of tags, and the system's response updating the user's list and providing the relevant product information. This can all be done automatically. The third screen shot, FIG. 21(c) is an example notification that can be provided to the user when the system detects that the product has gone on sale, and the fourth image shown in FIG. 21(d) provides a link where the user can purchase the discounted product.

With continuing reference to FIG. 21(a), the URL shown where a user can access all of the items that have been saved and associated with a particular user. The list can be accessed anytime on mobile or desktop, and allows the user a central digital place to maintain items they have found in-store. Once items are on the list they will be tracked, monitored, and maintained.

As discussed above, if one of the items that the user has designated on their personal list goes on sale, the user can be notified. For example, the user can be provided with a product picture, product information, price information, and/or product link that the user can select to be taken directly to a website where the product can be ordered.

The disclosed systems and methods provide significant advances for retargeting/remarketing for offline stores. As an example, a user can take a picture of a product tag or manually type in a product code as discussed above, and the information about the tag/code and the person submitting the information is stored in a database. Once a user clicks on a product image, a pixel can be dropped allowing Hafta Have to resurface (e.g., re-present) the offline image online (e.g., the consumer is re-exposed to the product and/or similar products based on the previous exposure). Using that information, products can be retargeted/remarketed to the user via social networks, google ads, and internet ad placements. By knowing the specific products that the consumer has expressed interest in (e.g., a particular dress, in a particular color, and a particular size), greatly improved targeted ads can be directed to the user on a variety of platforms that the user may use, for example, Facebook, Twitter, Pinterest, Google+, Linked In, and others.

Figure 26:
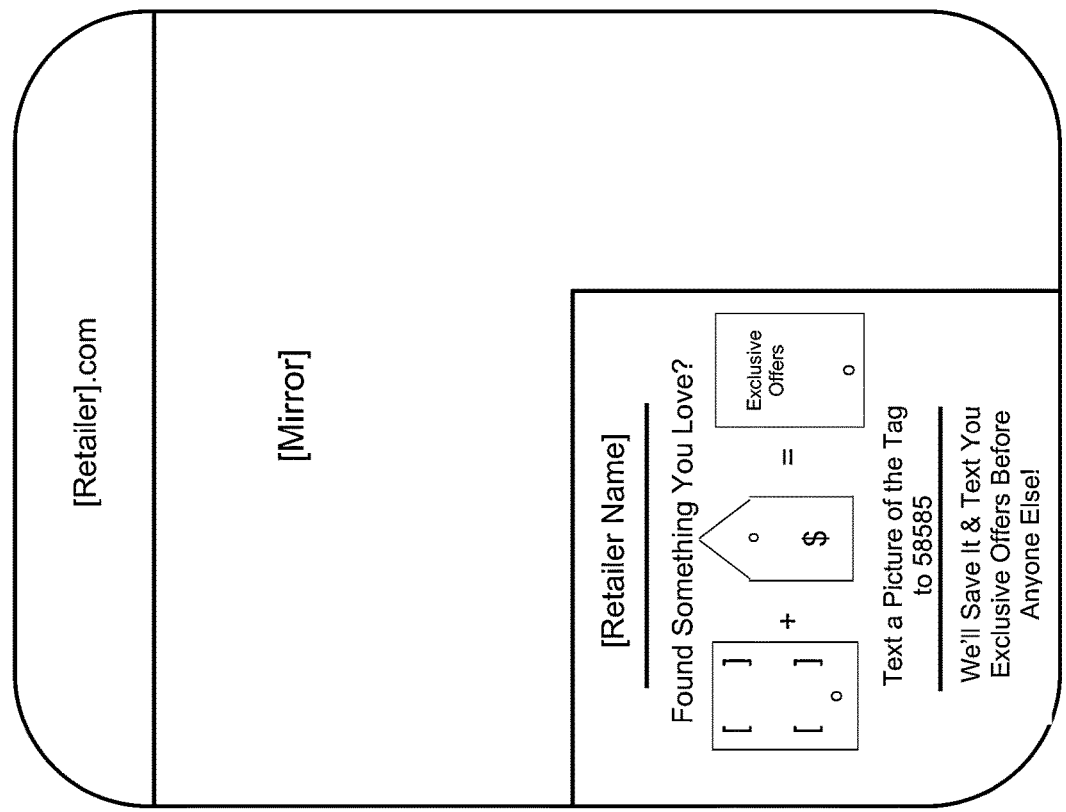
FIG. 26 shows an exemplary embodiment of indicia shown in a store location.
Figure 27:
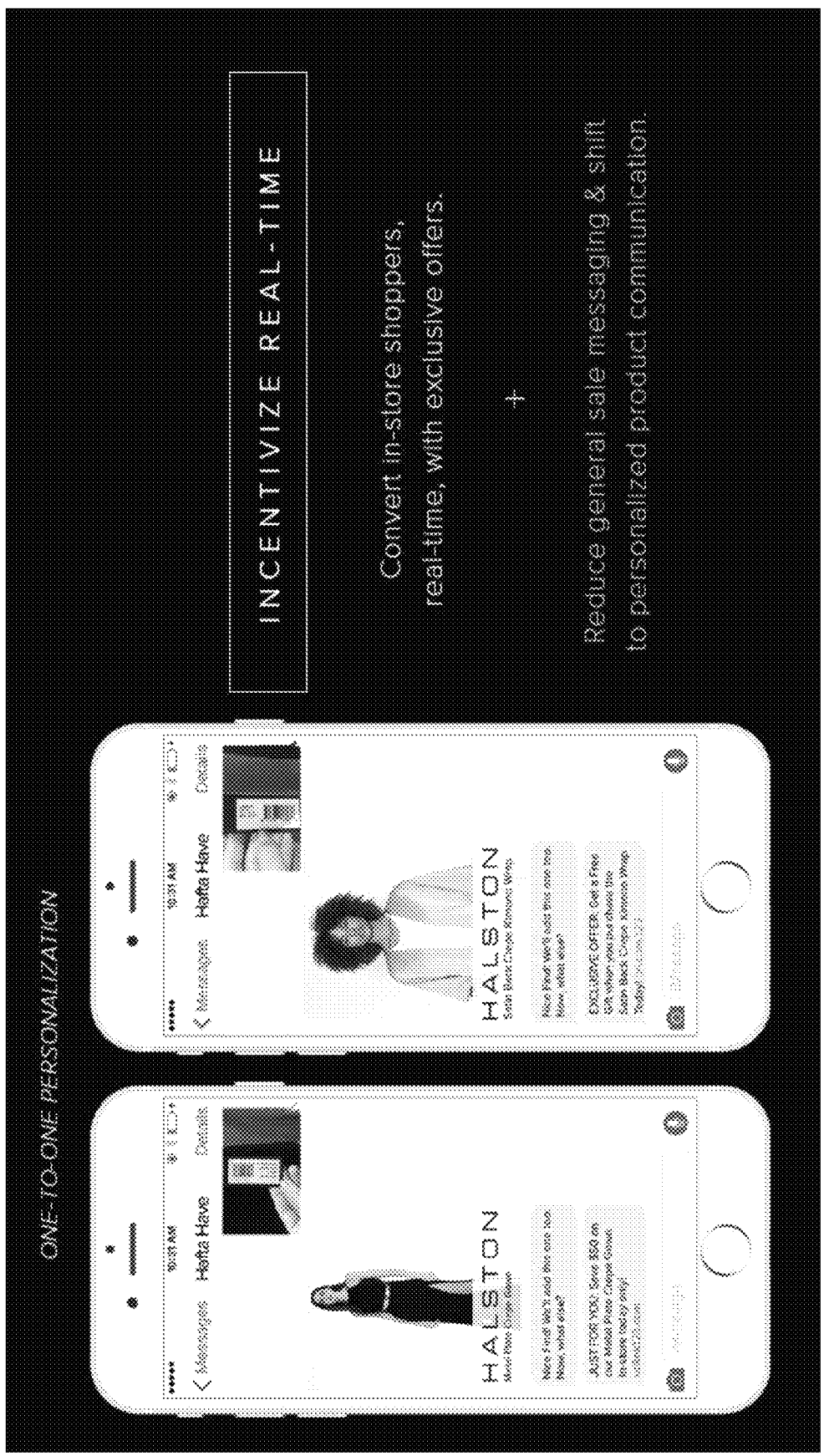
FIG. 27 shows exemplary screen shots of discounts and offers being sent to a user.

Some embodiments of the present invention may also utilize separate indicia to facilitate use of the systems and methods as provided here. As used herein, "indicia" means some notification to users about how to use some embodiments of the present invention. Exemplary embodiments of the indicia are shown in FIG. 26. For example, the indicia can be placed on dressing room mirrors (e.g., mirror cling), on signage throughout the store, or on product tags themselves. The indicia may have pictures and/or text that may explain to shoppers that they can take a picture of the tag, text it to a particular number, and then receive notifications about discounts, coupons, sales, etc. FIG. 27 shows exemplary screen shots of discounts and offers being sent to a user in response to the user texting a tag.

In some embodiments, some digital media may also have the indicia about use of the systems and methods provided herein. For example, a retailer's website or app may include the same type of indicia that described in the store location above. Additionally, particular web pages or app may provide a specific type of electronic tag for an individual product that can be separately texted as provided herein. For example, if a user is searching through a particular retailer's inventory on a webpage or app, and locates a particular product that they want to receive notifications about discounts, coupons, sales, etc., the retailer may provide a separate electronic tag that can be "clicked" or selected by a user, and which can then be texted by the user for storage and tracking using the standard built in capabilities of smart phone, tablet, PC, etc. Thus, rather than a user physically taking a picture and texting that picture, the retailer can effectively provide the same data in pre-prepared image or "photo" that is configured for automatic processing and data extraction like that used for actual photographs from a user.

The ability to track particular users, and various relationship with retailers, also allow very specific, and selective retargeting, and programmable in-store conversion. If a user tags a particular product associated with a retailer, the retailer may provide the system administrator with specific instructions to provide various discounts or incentives at various times, at various levels, or with instructions to seek to upsell other products. As explained above, retailers may have access to the data that has been saved in the user tagged databases 35. For example, J Crew may have default settings that if a user tags a line of shirts to their list of products that are saved to the system (user tagged database 35), that the user is instantly provided a discount of 10%, but perhaps only good for that specific day. In other applications, a retailer may decide to offer a discount for certain products. In practice, the databases containing the instructions and rules to implement the desired discount could be part of the retailer's ecommerce/mcommerce platform 45, and the instructions and rules are compared to the user tagged database 35 to determine what users have products covered by the discount, and automatic notifications can be distributed. In some embodiments, the instructions and rules to implement the desired discount could be maintained by a party other than the retailers, for example, the party that maintains the user tagged database 35. Other limitations can be provided on the discount or incentive to provide real-time incentive to purchase the product at that particular time. Additionally, there can be an escalating set of discounts or incentives, for example, a 10% discount is provided instantly, but perhaps the discount is raised to 20% a week later if the consumer hasn't purchased the product. Different product discounts or coupons can be provided in different time windows. This allows retailers to provide customized triggers and logic based on their own preferences.

As described above, the system may track the various sales and discounts of a variety of retailers, either by monitoring the retailer e-commerce/mcommerce platforms 45, or by receiving direct communications from the retailers. By doing so, the system can also provide retailers and specific brands with notifications that may affect their particular products, and allow the retailers to make decisions about their own products. For example, some particular brands are sold through bigger retailers, but also through the brands own brick and mortar stores or the brand's own e-commerce websites. If a third party retailer decides to put a particular brand on sale (for example, Nordstrom's puts its Ann Taylor brands on sale for 20% off), Ann Taylor could be notified of the sale, and provide Ann Taylor the opportunity to make adjustments to the prices shown on its own brick and mortar stores and/or its e-commerce platform.

Similarly, a particular brand may know that it is about to launch a particular sale on a particular line of products in 2 weeks. That brand could authorize the system administrator to provide any user tagging a product that will go on sale in 2 weeks with a particular discount or coupon that may be similar in nature to the discounts or coupons that will be offered in 2 weeks. Again, this allows real-time conversion and product specific targeting.

Preferably, the system and methods disclosed herein use short codes for transmitting the user's product tags and product information. Because these short codes are shorter than a regular telephone number, they are easier to remember and shorter to provide as part of the indicia to users.

The systems and methods disclosed herein may also pull, crawl, or search information from a variety of sources. For example, the systems may crawl the particular e-commerce/mcommerce platform 45 (or separate database) for a particular retailer looking for products that have gone on sale, new sizes that have been announced, new colors that are being provided, etc. The systems may also crawl big box retailer e-commerce platforms for similar information, along with other known shopping platforms for information about products that have been tagged by the system's users. The system can have programmed and configurable sets of rules that dictate how potential product notifications are handled.

For example, assume a particular user has tagged a particular shirt, and which has been saved by the system. Further assume that based on the crawling of the various information sources outlined herein, that the shirt has been listed as "on sale" at the same price on two different websites, one at Nordstroms, and one at Ann Taylor. The system is configurable and programmable on how this situation is handled. For example, the user could be provided a notification that the product has gone on sale at both locations, and provided a link to both sites where the product can be purchased. Alternatively, if one of the two locations has become a preferred member or affiliate with the system's administrator, the system could be provided with a set of predetermined rules that only the preferred member/affiliate's purchase information is provided to the user. Additionally, the system can provided with sets of predetermined rules associated with sales affiliates/aggregators, like Pepperjam and CJ Affiliate, where sales are routed through the sales affiliates/aggregators and the site administrator generates some commission or portion of the sale through that relationship. For example, the sales affiliate/aggregator may have arrangements in place whereby the retailer pays the sales affiliate/aggregator some percentage (for example, 10%) of the sales price driven by ads, marketing, or traffic by the sales affiliate/aggregator. If the system administrator has a separate relationship with such a sales affiliate/aggregator, and one of the products that goes on sale is from a retailer that is associated with such a sales affiliate/aggregator, the notifications, discounts, or coupons provided to the user will be associated with the retailer with such relationship, and which allow a revenue split of the commission due to the sales affiliate/aggregator with the system administrator.

While the foregoing disclosure is often described in the context of clothing, personal items, jewelry, etc., the foregoing systems and methods can be utilized to track, manage, and provide notifications regarding virtually any type of consumer product, ranging from electronics to groceries, and can include restaurants. For example, a consumer could text the name of a restaurant like he/she would text a photograph of a tag or the style code of a particular product, that restaurant name could be saved, and special coupons, discounts, or specials could be provided to the consumer.

Figure 24B:
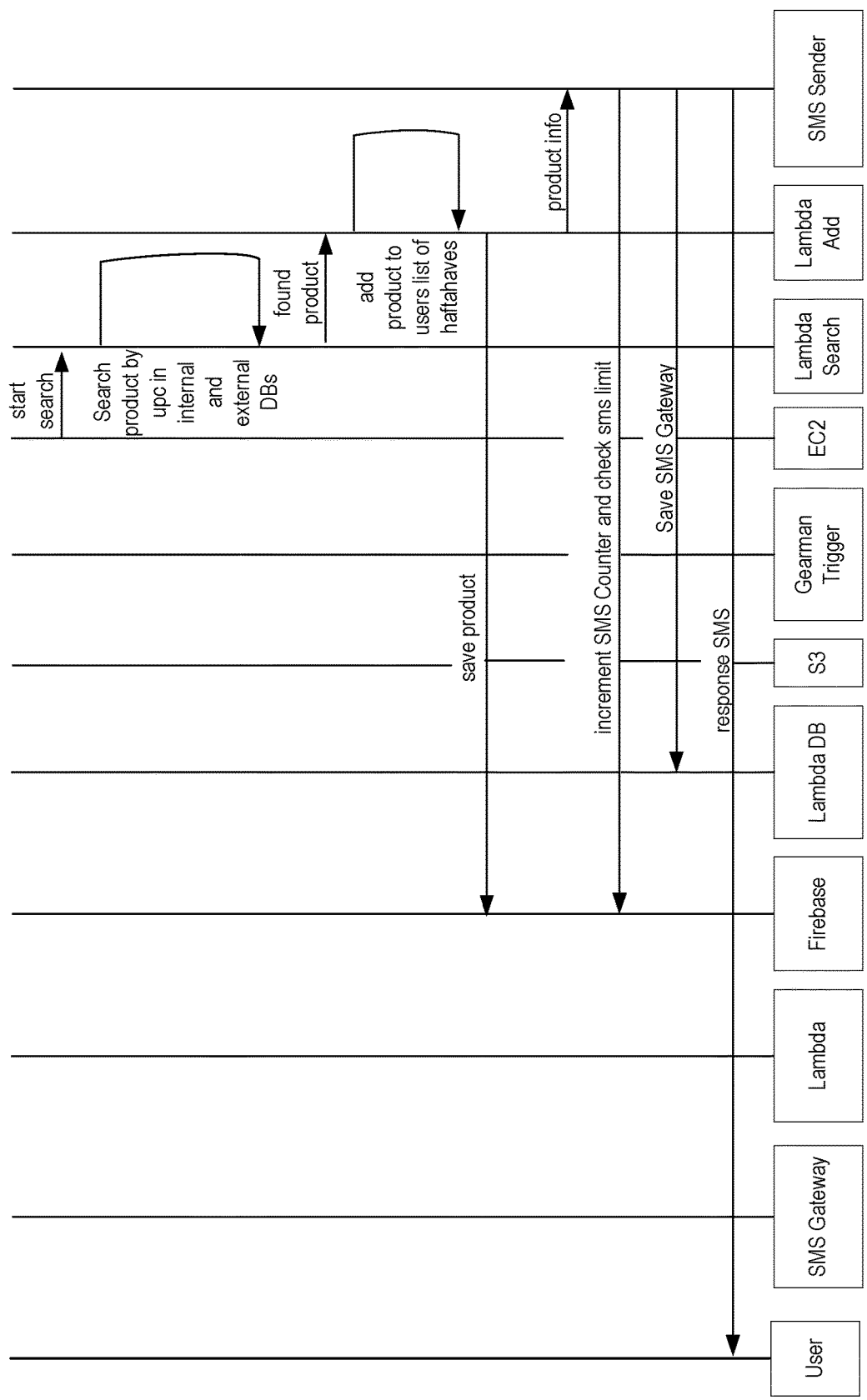
FIGS. 24(*a*) and 24(*b*) show an exemplary workflow for adding a product to a user's wish list for tracking and potential notifications.
Figure 25:
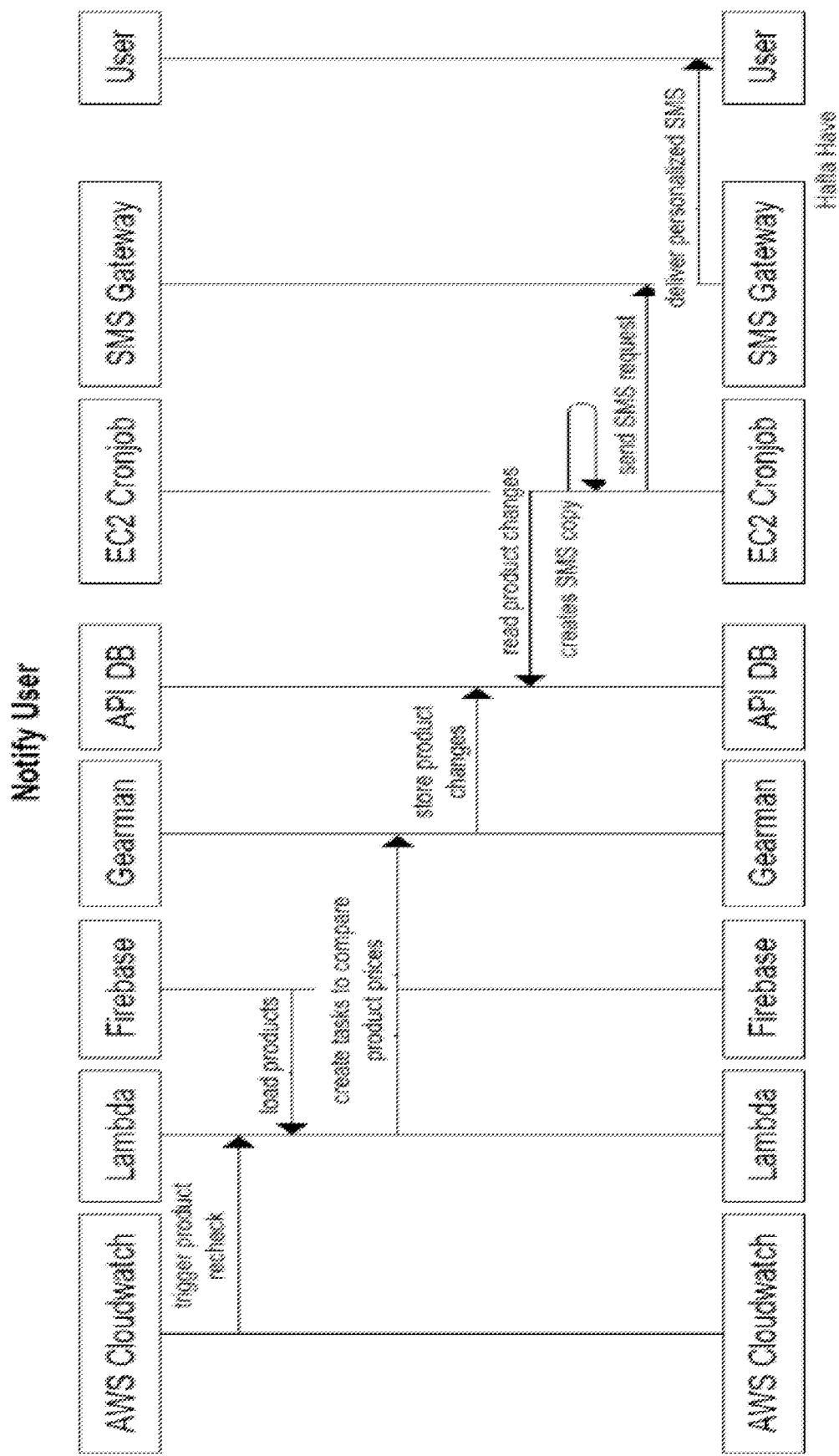
FIG. 25 shows an exemplary workflow for notifying a user about a product change associated with a user's wish list.

In some embodiments of the present invention, a serverless architecture is utilized, and provides additional advantages over more traditional hosting systems. Serverless architectures generally refers to applications involving third-party services (often referred to as Backend as a Service or "BaaS") or custom code that is run (often referred to as Function as a Service or "FaaS"), for example, AWS Lambda. Thus, rather than having client-dedicated, 'always on' server system sitting behind an application, and moving to a serverless architecture, the system reduces operational cost and complexity. The server-side logic is can simply be run in stateless computer containers that are event-triggered, ephemeral (may only last for one invocation), and fully managed by a 3rd party. An exemplary workflow for adding a product to a user's wish list via text message using this architecture is shown in FIGS. 24(a) and 24(b). An exemplary workflow for notifying a user using this architecture is shown in FIG. 25.

Many existing systems and methods still lack the ability to provide actualized purchase data or attribution to a particular system or method that may be designed to assist shoppers. One example to provide some type of attribution would be to allow a particular retailer to key in a code that may have been provided by a specific type of mobile app or other advertisement. However, unless the transactional data is provided by the retailer to the mobile app developer/owner/operator, the mobile app developer/owner/operator may not be able to provide a direct link between a particular promotion or promotion code and an in-store (or on-line) purchase by a particular consumer.

In some embodiments, improved systems and methods are provided to track and provide actualized purchase data. In some embodiments, when a shopper makes a purchase, they can take a picture of the receipt and text or email it to a central repository for storage, and content extraction and management, for example, an app developer/owner/operator that provides certain promotions, discounts, etc. The receipt can be read using the same technology as described above with respect to sending a tag, and the systems can differentiate between tags and receipts. An image of the receipt can be saved, and the receipt and its content associated with the profile of a particular user in manner similar to that of a tag. In other words, a picture of the receipt can not only be associated with a particular user (e.g., because it came from a particular cell phone or e-mail address associated with a distinct user), but also associated with the products reflected on the receipt.

Occasionally, a shopper may need a receipt, for example, when returning the product. However, many shoppers have difficulty finding the physical receipt, or difficulty in determining which of many receipts applies to the item they want to return. In some embodiments of the present invention, a shopper can text or e-mail a picture of the tag attached to or associated with a product and the systems described herein will return (text or email them back) the receipt that corresponds to that item. In other embodiments, a user can simply request all the receipts associated with them, or select from a list of receipts associated with them. For example, the receipts can be sorted and/or displayed by retailers, by date, by type of product (pants, shirts, shoes), etc., in case the shopper only recalled certain information about the purchase but didn't have the product tag. The returned receipt can be as a picture of the actual receipt (and which may include a bar code or other machine readable code that allows the retailer to pull up the transaction associated with the receipt). The shopper can either print out the picture or show the picture to the retailers directly from a mobile device that can receive the returned receipt (e.g., a cell phone). By maintaining an image of the actual receipt, associating the receipt with a particular user and the items reflected on the receipt, and being able to provide an image of the receipt upon request from a user, the present system and method provide a technical solution to a very common problem associated with losing paper/digital receipts, or shoppers having to make sure they have the correct receipt when trying to make a return.

The data obtained from the receipt will allow creation of a complete data story about the shopper, providing information regarding what they intended to buy and what they actually purchase, as evidenced by the picture of the receipt. This data can be provided to retail partners and used to create insights around purchase patterns, purchase intent, product preference, and reporting of actualized purchase data. This type of data, previously uncaptured, can be very valuable for both retailers and any third parties that may be providing promotion of certain product, and which can demonstrate, with real, verifiable data, that particular promotions or communications are leading directly to purchases by shoppers.

Figure 28:
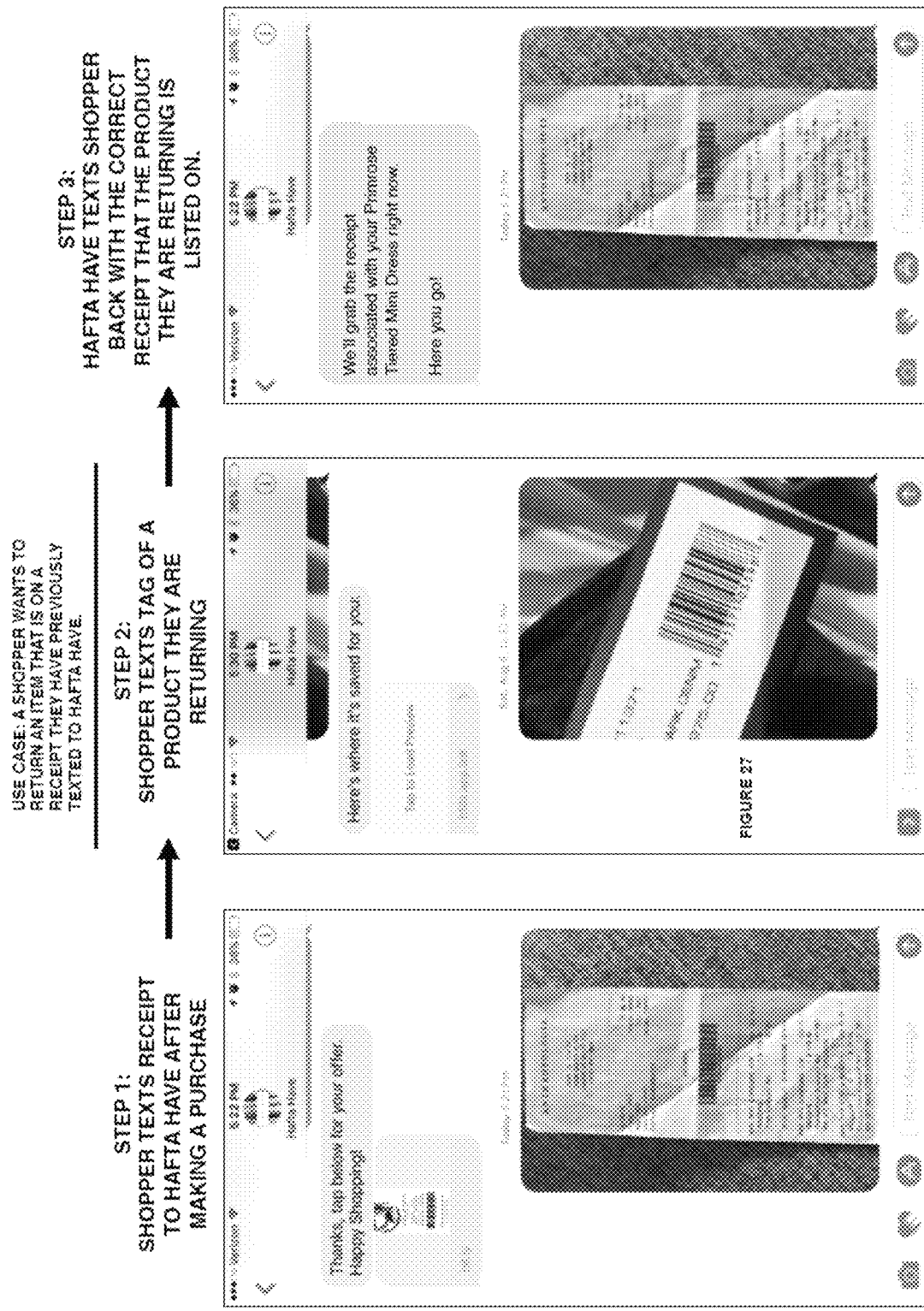
FIG. 28 shows a series of screen shots depicting different aspects of one embodiment of the invention.
Figure 29:
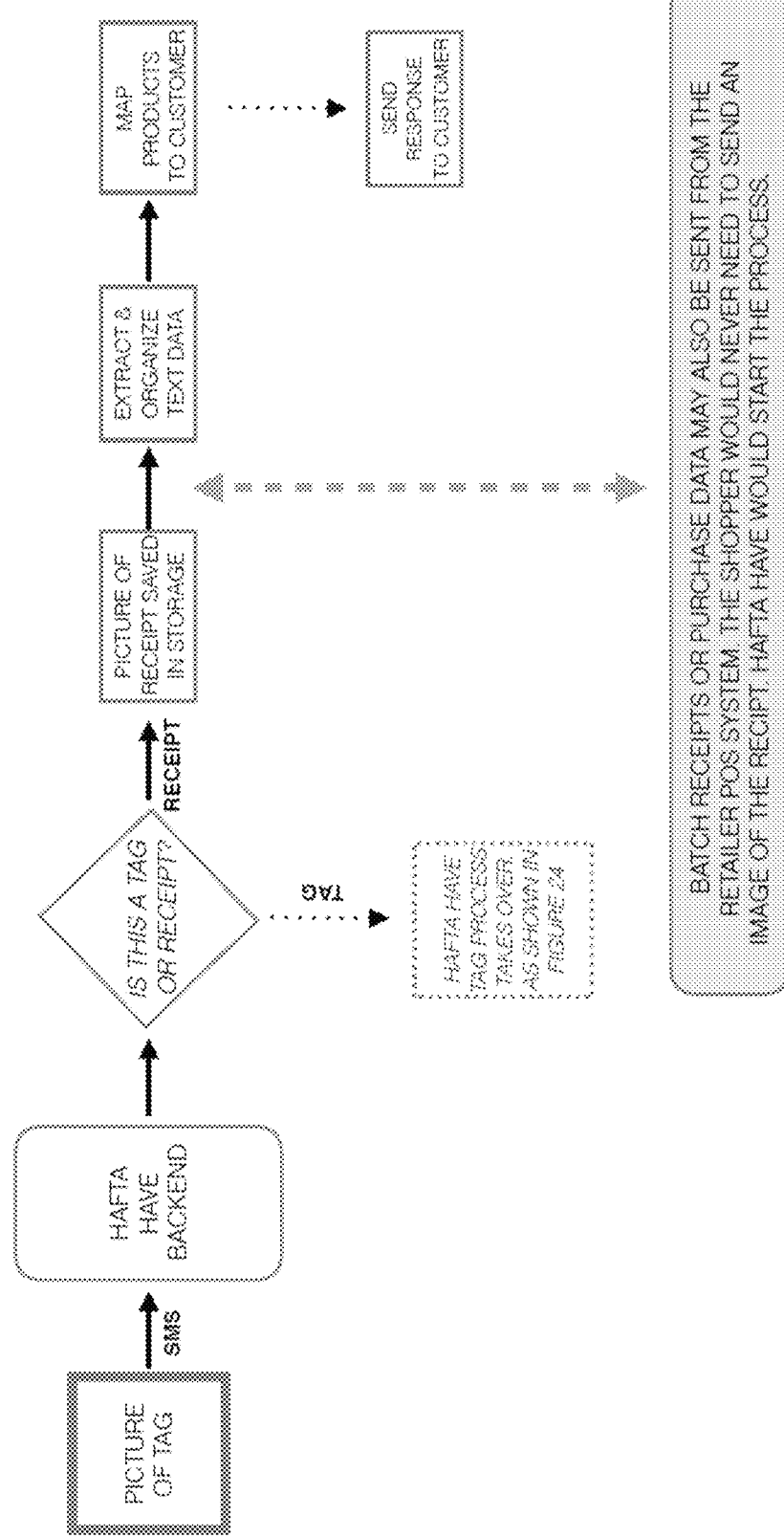
FIG. 29 shows an exemplary workflow associated with a shopper texting a tag or receipt to have receipts returned to them.

An exemplary workflow is shown in FIG. 28. In the first screen shot, the shopper has taken a picture of a receipt and texted the receipt for storage. In the second screen shot, a link has been provided to the user after receipt of the receipt that allows the user to preview what was stored for the user. At the bottom of the second screen shot, the user has taken a picture of a product tag and texted it in order to receive a copy of the receipt. The third screen shot is the system's response, acknowledging the product associated with the tag sent by the user, and the bottom of the third screen shot is the returned image of the receipt. FIG. 29.is also another exemplary workflow of some embodiments showing the treatment of tags and receipts sent from users.

In some embodiments, the same functionality can be provided without a user actually texting or transmitting a copy of the receipt. For example, receipts and/or purchase data can be provided by a retailer's inventory, sales, and point-of-sale systems, and for those purchasers for which associations and relationships can be made (i.e., the purchaser associated with this sale can be tagged or associated with corresponding name, credit card information, e-mail address, phone number, etc.), the same receipt information can be saved and requested by users.

The description provided herein is not intended to limit the scope of this patent. The claimed subject matter might also be embodied in other ways to include different steps or combinations of steps similar to the ones described in this document, in conjunction with other present or future technologies.

Figure 30:
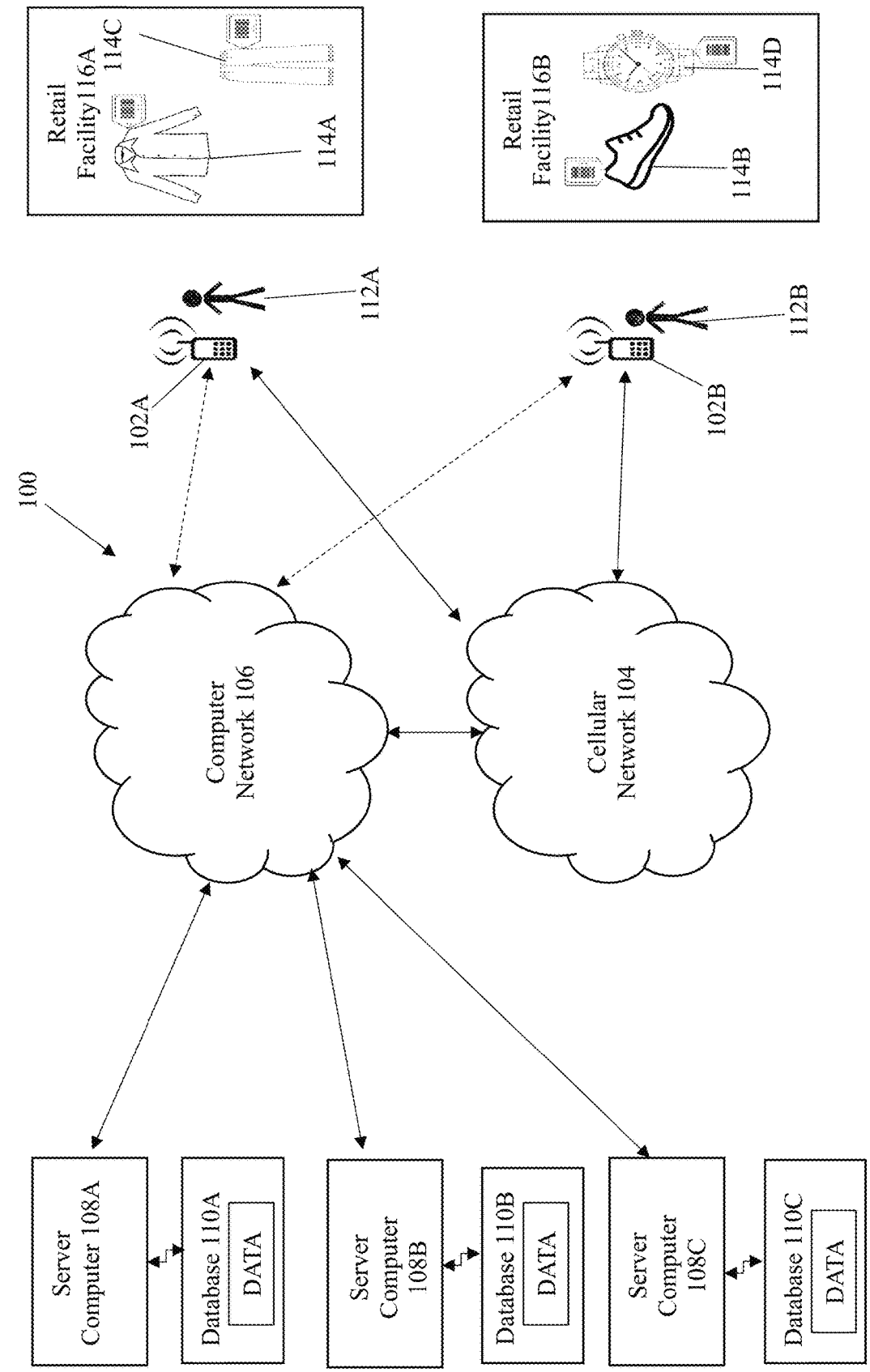
FIG. 30 shows an exemplary operating environment showing various aspects of components that can be used in one embodiment of the invention.

FIG. 30 illustrates one embodiment of a computer system 100 configured to operate as described above. The exemplary workflows and architectural implementations shown in FIGS. 24(a) and 24(b) and FIG. 25 (adding a product to a user's wish list via text message, and notifying a user using this architecture, respectively) can be implemented using the overall architecture shown in FIG. 30, i.e., the generic reference to database 110A, 110B, etc. in FIG. 30 can correspond to the more specific references to Firebase database, Lamda database, etc. in FIGS. 24(a), 24(b), and 25.

As shown in FIG. 30, the computer system 100 includes a plurality of portable wireless user devices 102 (referred to collectively and/or generically as elements 102 and specifically as elements 102A, 102B), a cellular network 104, a computer network 106, servers (referred to collectively and/or generically as elements 108 and specifically as elements 108A, 108B, 108C), and databases 110 (referred to collectively and/or generically as elements 110 and specifically as elements 110A, 110B, 110C). More specifically, the server 108A is operably associated with the database 110A. The server 108A is configured to execute computer programs that manage the database records stored in the database 110A. The database 110A includes one or more non-transitory computer readable mediums (not explicitly shown) that store the database records, along with database metadata that describes the relationships between the database records and fields in the database records. The database records and database metadata are stored in the form of digital data. The server 108B is operably associated with the database 110B. The server 108B is configured to execute computer programs that manage the database records stored in the database 110B. The database 110B includes one or more non-transitory computer readable mediums (not explicitly shown) that store the database records, along with database metadata that describes the relationships between the database records and fields in the database records. The server 108C is operably associated with the database 110C. The server 108C is configured to execute computer programs that manage the database records stored in the database 110C. The database 110C includes one or more non-transitory computer readable mediums (not explicitly shown) that store the database records, along with database metadata that describes the relationships between the database records and fields in the database records.

Computer systems may include one or more computers, wherein each of the portable wireless user devices 102 and the servers 108 are different types of computers. Thus, each of the portable wireless user devices 102 and the servers 108 are also computer subsystems of the computer system 100.

A computer may be a uniprocessor or multiprocessor machine. Accordingly, a computer may include one or more processors and, thus, the aforementioned computer system may also include one or more processors. Examples of processors include sequential state machines, microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), gated logic, and other suitable hardware configured to perform the various functionality described throughout this disclosure.

Additionally, the computer may include one or more memories. Accordingly, the aforementioned computer systems may include one or more memories. A memory may include a memory storage device or an addressable storage medium which may include, by way of example, random access memory (RAM), static random access memory (SRAM), dynamic random access memory (DRAM), electronically erasable programmable read-only memory (EEPROM), programmable read-only memory (PROM), erasable programmable read-only memory (EPROM), hard disks, floppy disks, laser disk players, digital video disks, compact disks, video tapes, audio tapes, magnetic recording tracks, magnetic tunnel junction (MTJ) memory, optical memory storage, quantum mechanical storage, electronic networks, and/or other devices or technologies used to store electronic content such as programs and data.

In particular, the one or more memories may store computer executable instructions that, when executed by the one or more processors, cause the one or more processors to implement the procedures and techniques described herein. The one or more processors may be operably associated with the one or more memories so that the computer executable instructions can be provided to the one or more processors for execution. For example, the one or more processors may be operably associated to the one or more memories through one or more buses. Furthermore, the computer may possess or may be operably associated with input devices (e.g., a keyboard, a keypad, controller, a mouse, a microphone, a touch screen, a sensor) and output devices such as (e.g., a computer screen, printer, or a speaker).

The computer may execute an appropriate operating system such as LINUX®, UNIX®, MICROSOFT® WINDOWS®, APPLE® MACOS®, IBM® OS/2®, ANDROID, and PALM® OS, and/or the like. The computer may advantageously be equipped with a network communication device such as a network interface card, a modem, or other network connection device suitable for connecting to one or more networks.

A computer may advantageously contain control logic, or program logic, or other substrate configuration representing data and instructions, which cause the computer to operate in a specific and predefined manner as, described herein. In particular, the computer programs, when executed, enable a control processor to perform and/or cause the performance of features of the present disclosure. The control logic may advantageously be implemented as one or more modules. The modules may advantageously be configured to reside on the computer memory and execute on the one or more processors. The modules include, but are not limited to, software or hardware components that perform certain tasks. Thus, a module may include, by way of example, components, such as, software components, processes, functions, subroutines, procedures, attributes, class components, task components, object-oriented software components, segments of program code, drivers, firmware, micro-code, circuitry, data, and/or the like.

The control logic conventionally includes the manipulation of digital bits by the processor and the maintenance of these bits within memory storage devices resident in one or more of the memory storage devices. Such memory storage devices may impose a physical organization upon the collection of stored data bits, which are generally stored by specific electrical or magnetic storage cells.

The control logic generally performs a sequence of computer-executed steps. These steps generally require manipulations of physical quantities. Usually, although not necessarily, these quantities take the form of electrical, magnetic, or optical signals capable of being stored, transferred, combined, compared, or otherwise manipulated. It is conventional for those skilled in the art to refer to these signals as bits, values, elements, symbols, characters, text, terms, numbers, files, or the like. It should be kept in mind, however, that these and some other terms should be associated with appropriate physical quantities for computer operations, and that these terms are merely conventional labels applied to physical quantities that exist within and during operation of the computer based on designed relationships between these physical quantities and the symbolic values they represent.

It should be understood that manipulations within the computer are often referred to in terms of adding, comparing, moving, searching, or the like, which are often associated with manual operations performed by a human operator. It is to be understood that no involvement of the human operator may be necessary, or even desirable. The operations described herein are machine operations performed in conjunction with the human operator or user that interacts with the computer or computers.

It should also be understood that the programs, modules, processes, methods, and the like, described herein are but an exemplary implementation and are not related, or limited, to any particular computer, apparatus, or computer language. Rather, various types of general purpose computing machines or devices may be used with programs constructed in accordance with some of the teachings described herein. In some embodiments, very specific computing machines, with specific functionality, may be required. Similarly, it may prove advantageous to construct a specialized apparatus to perform the method steps described herein by way of dedicated computer systems with hard-wired logic or programs stored in nonvolatile memory, such as, by way of example, read-only memory (ROM).

In some embodiments, features of the computer systems can be implemented primarily in hardware using, for example, hardware components such as application specific integrated circuits (ASICs) or field-programmable gated arrays (FPGAs). Implementation of the hardware circuitry will be apparent to persons skilled in the relevant art(s). In yet another embodiment, features of the computer systems can be implemented using a combination of both general-purpose hardware and software.

Each of the portable wireless user devices 102 may be a processor controlled device, such as, by way of example, smart phones, laptop computers, tablets, portable computers, handheld computers, palm top computers, personal digital assistants, interactive wireless devices, and/or the like that is configured for wireless communication. Each of the portable wireless user devices 102 may include one or more processors (not explicitly shown) and at least one memory (not explicitly shown) configured to store computer executable instructions. The portable wireless user devices 102 may each include, one or more antennas, radio frequency (RF) circuitry, and RF transceivers that configure the portable wireless user devices to transmit and receive RF signals. The RF signals are modulated to carry data. In this manner, the portable wireless user devices 102 are configured to receive and transmit data. Each of the portable wireless user devices may employ multiple-access technologies include code division multiple access (CDMA), time division multiple access (TDMA), frequency division multiple access (FDMA), orthogonal frequency division multiple access (OFDMA), single-carrier frequency division multiple access (SC- FDMA), and time division synchronous code division multiple access (TD-SCDMA) wireless communication technologies.

Each of the portable wireless user devices 102 are configured for wireless communication, including wireless cellular communication. Thus, the portable wireless user devices are configured to transmit and receive RF signals that carry data to and from the cellular network 104. For example, the cellular network 104 may be an Evolved Universal Mobile Telecommunications System (UMTS) Terrestrial Radio Access Network (E-UTRAN)). The cellular network 104 may thus be configured to transfer of user data and provide radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. In this manner, the cellular network 104 may transmit the data to or receive the data from the computer network 106 (e.g., the Internet). The servers 108 can thus transmit data to the portable wireless user devices 102 or receive data from the portable wireless user devices 102 through the computer network 106. The cellular network 104 may transmit the data to or receive the data from the computer network 106 (e.g., the Internet). In the preferred embodiment, the computer network 106 is a public computer network such as the Internet. However, other types of computer networks 106 may be used such as wide area networks (WANs), local area networks (LANs), metropolitan area networks (MANs), campus area networks (CANs), and/or the like.

The computer system 100 provide a solution that is necessarily rooted in computer technology in order to overcome problems arising in the realm of computer networks. The computer system 100 also provides a technical solution to many of the technical problems that arise with the use of mobile applications and their use in seeking to track consumer purchasing intent. Specifically, the computer system 100 uses the built-in mobile device capabilities of the portable wireless user devices 102, and combines them in a unique way to allow users (referred to collectively and/or generically as elements 112 and specifically as elements 112A, 112B) to save information about products (referred to collectively and/or generically as elements 114 and specifically as elements 114A, 114B) they have found at physical retail facilities (referred to collectively and/or generically as elements 116 and specifically as elements 116A, 116B) from retailers. Through the servers 108, retailers can also transmit notifications regarding the products 114 to the portable wireless user devices 102 and thereby inform the users 112 about relevant information regarding the products 114 that the users 112 are interested in. Furthermore, the computer system 100 allows the users 112 to save and receive this information about the products 114 without the disadvantages presented by mobile shopping aps. For instance, the user 112 does not have to log in to a user account or remember a user name or password. The techniques described herein also do not take up memory on the portable wireless user device 102 or consume significant amounts of processing power.

One implementation of the computer system 100 is employed is administered through a dedicated software application running on a single server. This implementation is described with respect to only server 108A for the sake of brevity. However, an identical implementation could be provided using either server 108B, 108C. Another implementation of the computer system 100 is employed through a serverless architecture that is distributed through multiple servers and will be described through the use of the servers 108A, 108B, 108C. It should be noted that other serverless architectures may be utilized, as would be apparent to one of ordinary skill in the art in light of this disclosure.

In one example shown in FIG. 30, the user 112A is interested the product 114A (e.g., a shirt) at the retail facility 116A (e.g., a clothing store). As shown in FIG. 30, each of the products 114 includes a tag with a machine readable product code (also referred to as "machine readable code product identifier"). Alternatively and/or additionally, the machine readable product codes may be printed on the products. Each of the portable wireless user devices 102 may include one or more cameras (not explicitly shown) so that each of the portable wireless user devices 102 are configured to capture digital pictures.

In this implementation, the user 112A captures a digital picture with an image of the machine readable product code 118 (see FIG. 21(*a*)). The user 112 then enters information into the portable wireless user device 102A such that the portable wireless user device 102 creates a multimedia cellular message. The user 112A causes the user device 102A to attach the digital picture with the image of the machine readable product code 118 to the multimedia cellular message.

Referring again to FIG. 30, the portable wireless user device 102A may then transmit the multimedia cellular message wirelessly so that the server 108A receives the multimedia cellular message that includes the digital picture with an image of the machine readable product code 118. The server 108A shown in FIG. 30 may have the same characteristics and capabilities as described with respect to the user database server 30 above. In one example, the portable wireless user device 102A transmits the multimedia cellular message wirelessly to the cellular network 104, which passes the multimedia cellular message to the computer network 106 and then is received by the server 108A. In another example, the portable wireless user device 102A transmits the multimedia cellular message wirelessly directly to the computer network 106 (e.g., through WiFi technology so that the server 108A receives the multimedia cellular message.

The server 108A that receives the multimedia cellular message may be configured to run software configured to run a code scan application (e.g., provide a tag reader system) on the digital picture with the image of the machine readable product code 118 to extract a product identifier 20 indicated by the machine readable product code. The tag reader system may utilize commercially available software and hardware known to those of skill in the art to extract and interpret the necessary information to output a corresponding product identifier 310. For example, the machine readable product code may be a bar code, a style code, a UPC code, a QR code and/or the like, which the tag reader system can interpret to determine the product identifier 20 that identifies the product 114A. In one example, the product identifier 20 is a digital number that identifies the product 114A and is provided by the retailer. This approach eliminates the need to incorporate a bar code scanner application onto the portable wireless user device 102A.

The server 108A then sends a query and searches at least one database 110A for a product record associated with the product identifier 310. As described above, database 110A may include data pulled from one or more retailer ecommerce/mcommerce server/databases and populated in database 110A. In some embodiments, the relevant retailer information is not stored in database 110A, but rather resides in database 110B and/or 110C, and the query and searches can be done through the computer network 106 of these other database. The product record includes product information 22 for the product 114A, such as one or more of size, color, product name, price, a digital picture of the product 114A (or a link to pull the product image), and/or the like. The product identifier 20 may also be included in the digital product records so that the product identifier 20 extracted from the digital picture can be matched to the product identifier 20 in the digital product record.

It should be noted that in alternative implementations, the server 108A may transmit the query to the servers of retailers, which have signed on as subscribers. These servers could then search their databases for the product identifier 20 to determine if the product identifier 20 was for one of their products.

Referring again to FIG. 30, the server 108A then causes the database 110A to store the product information 22 in a user-specific digital list 128A that is associated with the user device contact identifier, which may be a telephone number, an IP address, a device name, and/or the like. If this is the first time that the user 112A has utilized the service so that the user-specific digital list 128 associated with the user device contact identifier does not exist, then the server 108A causes the database 110A to create the user specific digital list and then stores the product information 22 in the user-specific digital list. If on the other hand, the user-specific digital list already exists, then the server 108A can locate the user-specific digital list using the user device contact identifier. The product information 22 will then be included in the user-specific digital list. By using the user device contact identifier to identify the user-specific digital list, the user 112A does not need to set up an account and/or remember a user name and password. This feature makes it much easier for a user 112A to get access to their user-specific digital list 128A and is still secure assuming that the portable wireless user device 102A has been set up by the user 112A with the appropriate access security features.

Figure 31:
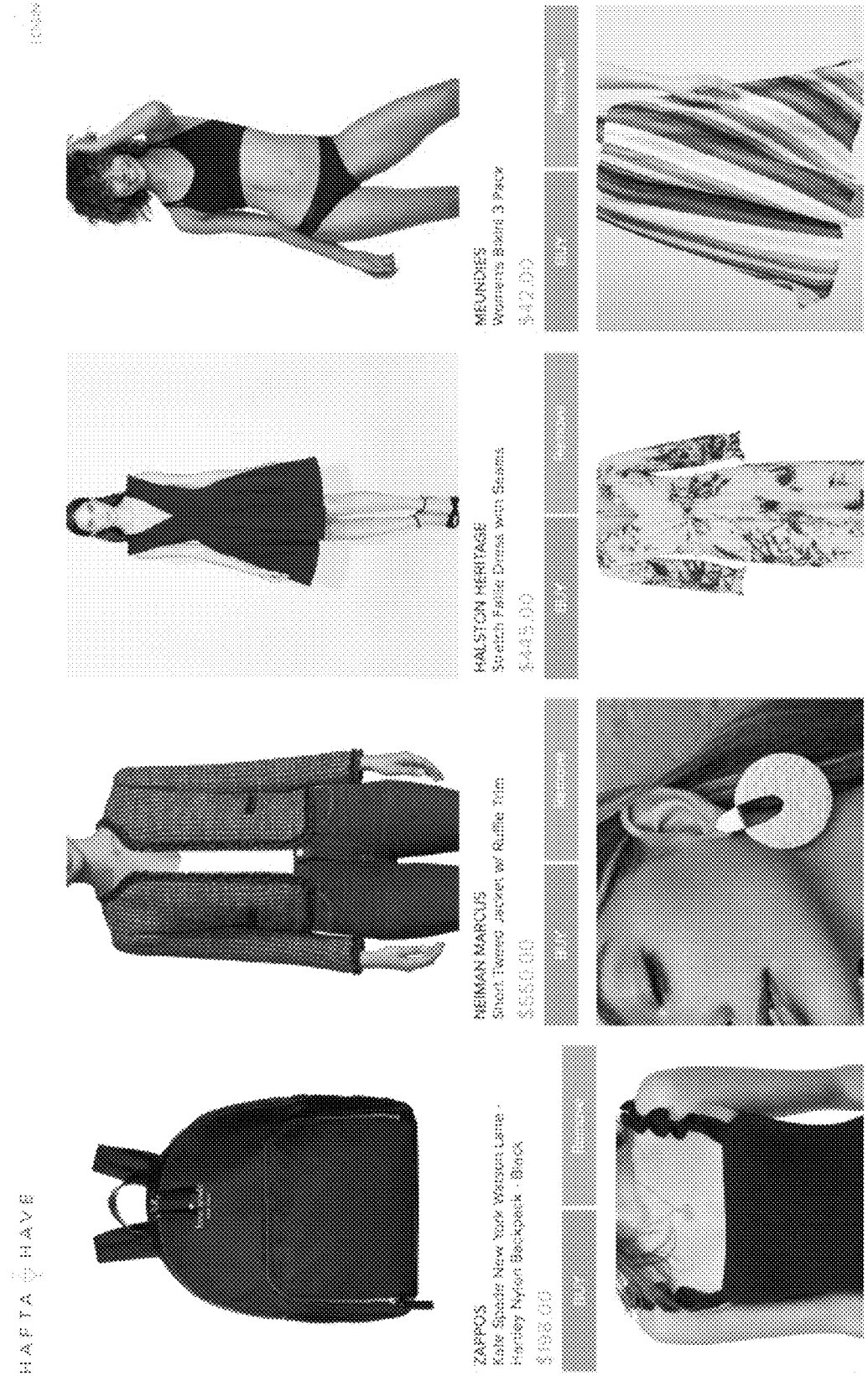
FIG. 31 is an exemplary screen shot of one embodiment of an individual user's wish list that is displayed when the user-specific URL is accessed.

FIG. 31 is an exemplary screen shot of an individual user's wish list that is displayed when the user-specific URL is accessed. As shown, a user may be displayed a picture of the products on their user-specific list, and the associated retailer name, product description, price, a "buy" button, and a "remove" button. A user clicking on the "buy" button may be directed to the retailer's own website or retailer-controlled URL where the user can purchase the product in conventional means of purchasing online goods. The "remove" button allows users to remove a particular item from their user-specific list.

Figure 32:
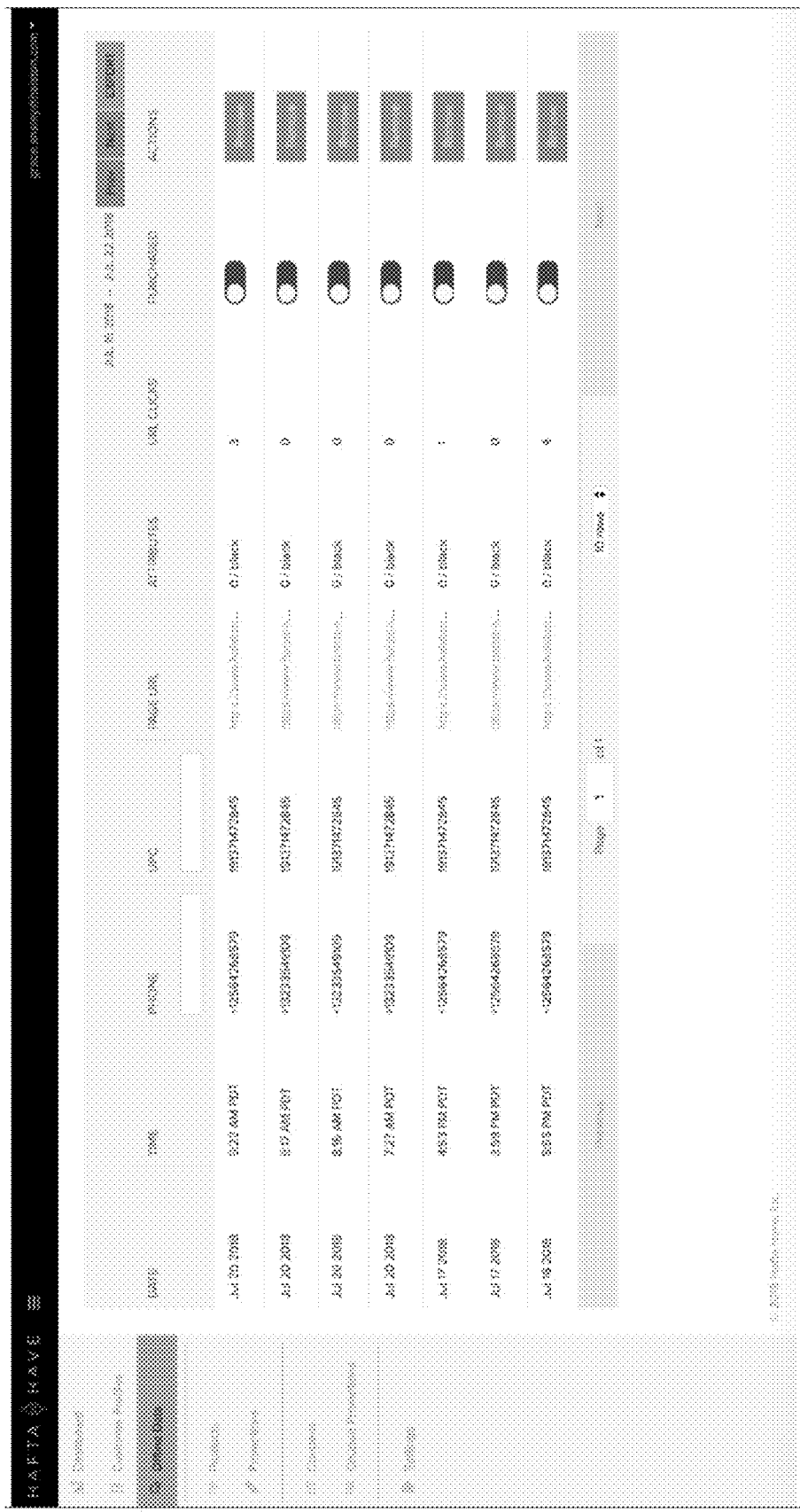
FIG. 32 is an exemplary screen shot of one embodiment of a dashboard showing the data that might be collected or associated with receiving a texted picture of a product tag.

FIG. 32 is an exemplary screen shot of a dashboard showing the data that might be collected or associated with receiving a texted picture of a product tag. In this embodiment, for each cellular message received, the following information is gathered and recorded: (1) date the cellular message was received; (2) the time the cellular message was received; (3) the phone number from which the cellular message was received (also referred to herein as the user device contact identifier); (4) the UPC code of the product associated with the tag sent via cellular message; (5) an internet URL where product information can be accessed (normally from a retailer-maintained URL); (6) product attributes/information (for example, the specific size and color of the product indicated by the barcode/QR code); (7) the number of "URL clicks" which is representative of how many times the user associated with the telephone number has clicked on the URL hyperlink to be directed to the webpage where the product information can be accessed (which can also represent a more interested party than one that has not clicked through); (8) whether the user associated with the phone number has purchased the product associated the original cellular message; and (9) the ability to remove a particular entry from the dashboard.

This dashboard might be provided to an administrator of the overall system 100 shown in FIG. 30, or the dashboard shown in FIG. 32 might be a retailer-specific dashboard that shows all user cellular messages associated with a particular retailer products. This dashboard and the data it provides can be sorted and displayed in a customized fashion. For example, all messages from a particular phone number could be displayed, all the messages related to a specific UPC code, all the messages received from a certain day, etc. While not shown, the geolocation information that might be associated with a cellular message could also be displayed in the dashboard. To Applicant's knowledge, this level of granularity for retailers has currently not been captured or utilized for this type of data.

Figure 33:
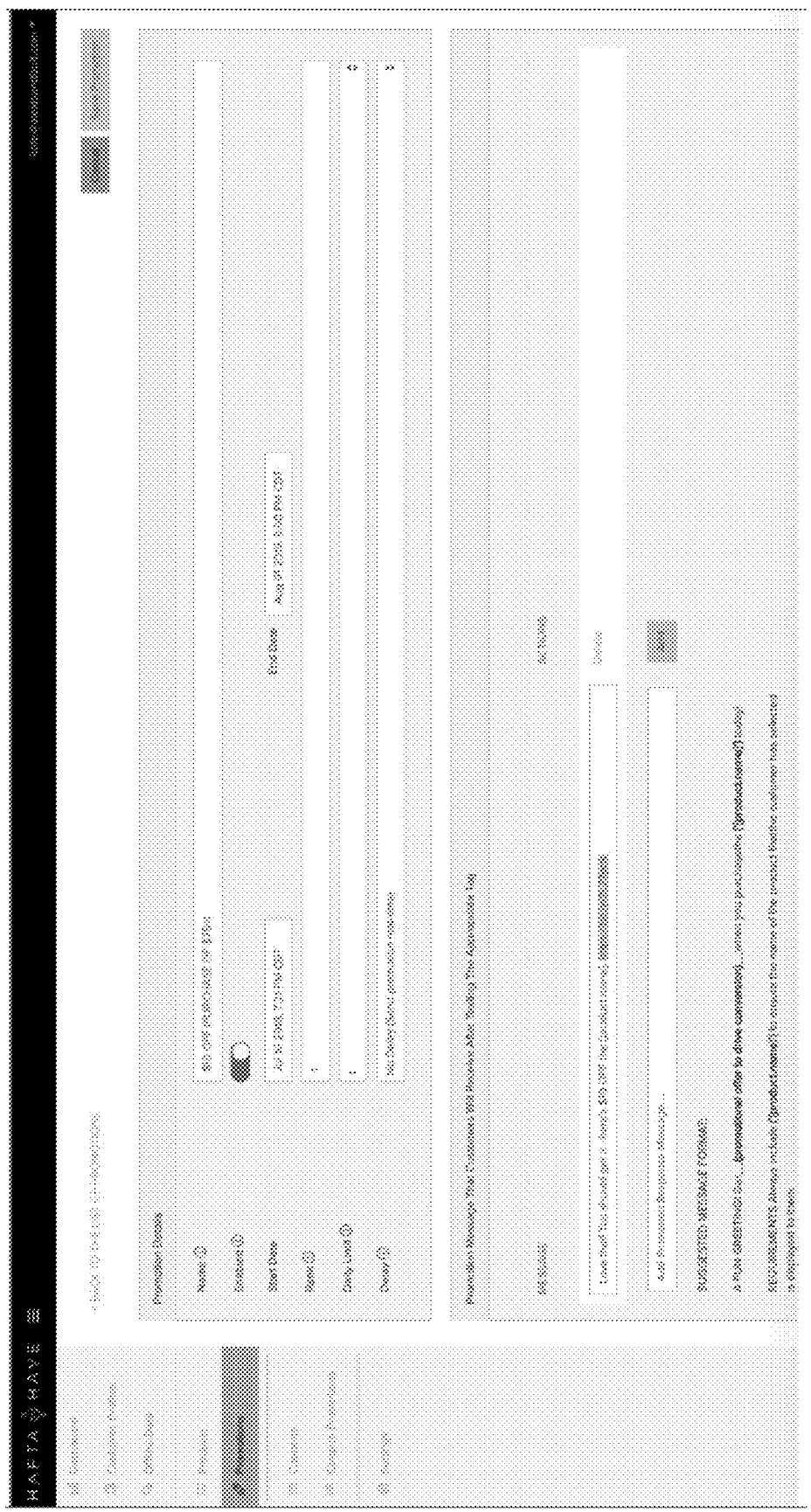
FIG. 33 is an exemplary screen shot of one embodiment of a promotions dashboard functionality.

FIG. 33 is an exemplary screen shot of a promotions dashboard functionality. This dashboard might be provided to an administrator of the overall system 100 shown in FIG. 30, or the dashboard shown in FIG. 33 might be a retailer-specific dashboard that allows a retailer to customize the types of promotions available for a retailer's products that might be the subject of a cellular message from users. As shown in FIG. 33, the retailer can be provided options to name a particular promotion, to turn on/off (e.g., enable) a particular promotion, to set start and end dates for the promotion, provide a "rank" (discussed further below), to provide a "daily limit" (discussed further below), to provide a delay for the promotion message, to customize the promotion message received by users, and to provide a customized URL link with additional promotional information (for example, a discount code or special advertisement that can be displayed or shown for the discount).

The "rank" is an optional but unique feature. This allows a retailer (or even a system administrator) to prioritize promotions that may overlap. For example, assume a retailer wanted to offer a 10% discount (a type of promotion) on all of its products over a certain weekend, but also 20% off dress shirts. In this case, if a user sends a digital picture of a tag associated with a dress shirt, once the system runs through the process described above to pull the product code, size, and color, and saves that to the user's wish list associated with the particular telephone number from which the tag was received, it can then be cross-referenced against on-going promotions. In this case, a tag for a dress shirt would potentially trigger the 10% discount for all products, and the 20% discount for dress shirts. If the retailer did not want the different promotions to be cumulative, in this case, the promotion related to the 20% off dress shirts might be given a higher priority than the 10% off all products, in which case the customer would receive the 20% discount via cellular message.

The "daily limit" field in FIG. 33 allows a system administrator or retailer to provide a numerical amount of the number of discount codes or messages it sends out associated with a particular product. For example, if a retailer fills in 5 in this "daily limit" field, and six users send a cellular message that qualify for the promotion message/discount in a day, only the first five users may get the promotion message. The "delay" field allows a system administrator or retailer to set a delay period between the time a product tag is received that qualifies for a promotional message/discount, and when the promotional message/discount code is sent to a user. For example, a retailer may not want to send a user a discount code immediately after a cellular message is sent by the user with the tag, but rather, the retailer may decide to send the discount one day later, one week later, or 2 weeks later if the user has not already purchased the product. This allows customized retargeting by each specific retailer based directly on user's already expressed interest in a particular product, even down to the size and color level.

The "rank" field can be important when the system determines that two or more promotions overlap, which is when a single product identifier (e.g., SKU, UPC) is included within the scope of two or more particular promotions.

Figure 34:
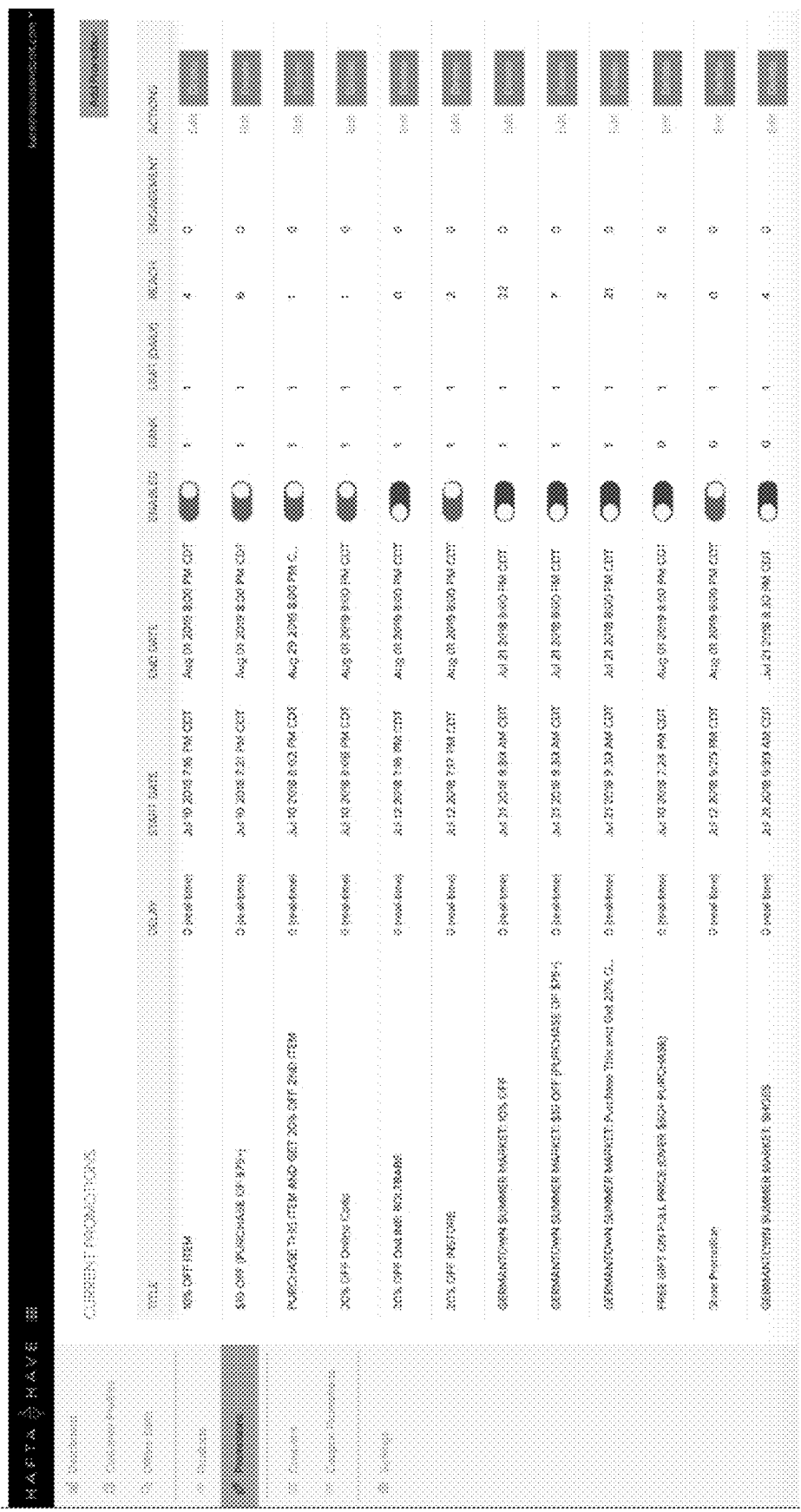
FIG. 34 is an exemplary screen shot of one embodiment of a promotions dashboard that displays the current promotions, in this case, for a particular retailer.

FIG. 34 is a screen shot of an exemplary embodiment of the promotions dashboard that displays the current promotions, in this case, for a particular retailer. This allows a retailer (or system administrator) to see all of the promotions that have been created using the dashboard shown in FIG. 33. As shown, the dashboard may include fields for (1) the title of the promotion; (2) the delay (if any—if no delay is entered, the promotion will be delivered "real time", or essentially at the same time the user's cellular message is received and processed); (3) the start and end times of the promotion; (4) whether the promotion is enabled (triggered or non-active); (5) the rank; (6) the limit (daily); (7) the reach (i.e., how many users have been provided the promotion); (8) engagement (i.e., whether any users have taken advantage of the promotion/discount and used it to purchase one or more of the products applicable to the promotion; and (9) whether to edit or delete the promotion. The particular promotions can retailer and/or system administrator specific.

There are many different types of options for different promotions, including (1) a percent off the current price a specific product (for example, the exact product associated with the tag sent via cellular message), (2) a specific amount off of retailer purchases exceeding a certain amount (e.g., $10 off a purchase of $75 or more), (3) purchase a particular product (for example, the product associated with the tag set via cellular message), and receive a certain percentage off a second item, (4) a certain percentage off for any on-line purchases (which can drive traffic to a retailer's website), (5) a certain percentage off a certain line of products, (6) a certain percentage off any instore purchases (which can drive traffic to a retailer's brick and mortar stores), (7) certain discounts at a particular location, or any combination of the foregoing. Other promotions are known to those of skill in the art.

Figure 35:
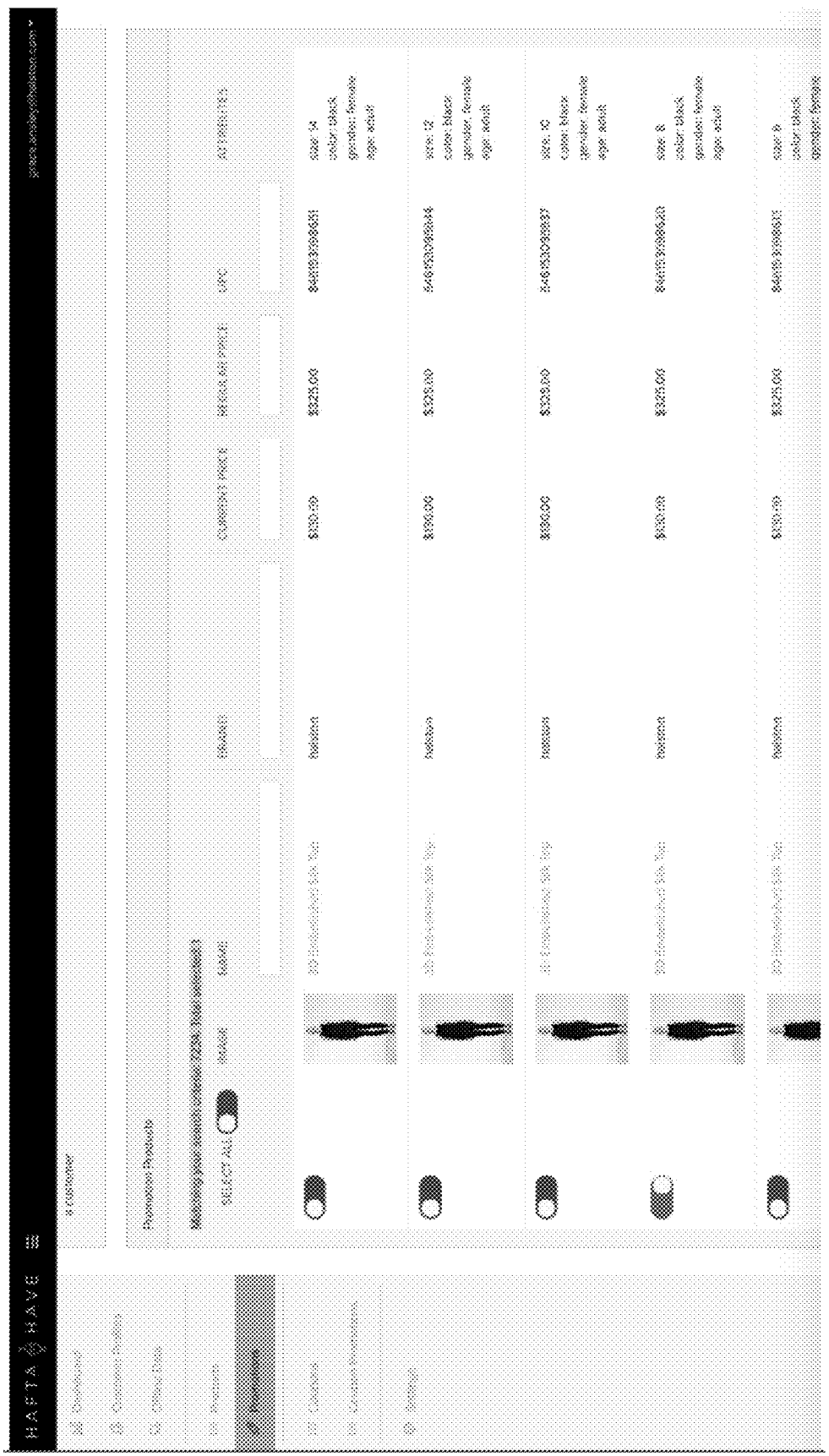
FIG. 35 is an exemplary screen shot of one embodiment of the promotions dashboard shown in FIG. 33.

FIG. 35 is a screen shot of an exemplary embodiment of additional functionality of the promotions dashboard shown in FIG. 33. This screen may result from a retailer designating the scope of a particular desired promotion. As shown, for a particular promotion designated by the retailer, a total of 7234 items are potentially subject to the promotion (for example, a retailer may have initially designated all shirts or tops). This screen shot allows the retailer to customize, at a very granular level, the scope of the discount, even down to colors and sizes of a particular product. Most retailers that currently offer discounts may offer store-wide discounts, or discounts on a particular, broad line of products. This dashboard allows a retailer to define the scope of the discount down to, for example, black, size 2, of an embellished silk top. This can allow a retailer to try to incentivize the purchase (albeit with a promotion) of a very specific product that may not be selling at the level expected or desired by a retailer. As shown in FIG. 35, for the products that fall into the search criteria, this dashboard may display to a retailer or system administrator (1) a picture of the product; (2) the product name; (3) brand, (4) current price; (5) regular price; (6) UPC; (7) product attributes (e.g., product information, and in this case, size, color, sex (male/female), and age (adult/youth/etc.), and allow the retailer to turn the discount on/off. For example, a retailer may first designate that it wants to potentially offer a promotion of a 10% discount associated with all its shirts, which might pull up 7234 products. The retailer can then select which ones of responsive products that it actually wants to offer the promotion.

Unlike prior art approaches to consumer marketing, the systems and methods disclosed herein are proactive. It sets up a set of rules in advance such that when a particular message is received related to a particular product, the system can automatically generate what is sent to a user (i.e., consumer). These rules can be product specific, even down to a particular size and/or color, it can be retailer specific, it can be instore or online specific, etc. The systems and methods disclosed herein can also be implemented reactively. For example, if a retailer were to provide a promotion for a particular product, the system can be configured to search for products that have been previously stored on user-specific lists to see which products may be subject to the promotion. For example, a particular retailer may configure a promotional message to be sent to any user that has a product subject to a newly-implemented promotion, or only users that have added a product subject to a newly-implemented promotion to their user-specific list within some designated number of days/weeks/months.

In some embodiments, when a user first sends a cellular message with a picture of a tag to the system, the system first seeks to confirm whether a message has ever been received from this particular user device contact identifier (e.g., cell phone number). If not, the user device contact identifier is added to the user database, along with the date and time of the message. If this is not the first message received from the user device contact identifier, the system proceeds to decode the machine readable product code.

Many product tags have a combination of numbers and a barcode, QR code, or the like, while many of the numbers of a particular product tags are visually perceptible to a user, ordinary users do not know what they mean. Additionally, users have no way to meaningful way decipher the information that may be coded in a barcode or QR code, or the like. In many instances, the barcode/QR code may have information related to specific attributes to a particular type of product represented by the numbers shown on a tag. For example, the bar code may include information related to the size and color of a particular product that would not be readily available even from the numerical representation on a tag.

Once the machine readable product code is deciphered as described above, and in combination with the information related to the incoming cellular message, the system can capture and track the information as shown in FIG. 32. The date, time, and phone fields can be determined directly from the receipt of the cellular message itself from the user. The UPC code may be derived from the numerical representations on the tag, or from the other portions of the tag (e.g., barcode, QR code, or the like). The page URL can be determined by searching the UPC in special product databases that are often provided by the retailers themselves (perhaps through a specially provided API), or commercially available databases that include product information, including URL links, for particular UPC codes. This page URL is the internet address where a user can access additional information about the product, and that often includes the product name, product UPC, product price, image of the product, etc. The product specific URLs are normally provided by and/or maintained by the retailer of the particular product. The attributes can be determined from the decoding of the barcode/QR code (where the 0 in FIG. 32 under "Attributes" represents a size zero, and the color of the product being black). Thus, even assuming the same general product, a black size 0 will have a different barcode than the same product in a black size 2. However, the same product in the same size and color should normally have the same barcode/QR code.

Some embodiments of the present invention allow for product level messaging, down to a size and/or color level for consumer products. Some embodiments unlock and provide data for retailers that has previously gone uncaptured, and can provide this type of product level data to retailers in a way that allows them to communicate with purchasers that have shown specific purchasing intent for specific products, and allows retailers to customize promotions to such users. It also allows retailers to proactively and automatically develop and target promotions to users in advance of product interest without use of an application downloaded to a user's mobile device.

In some embodiments, each user in the user database is assigned a particular URL, where all of the products that have been added to that user specific list can be maintained. This is preferably done when the system detects a new user, e.g., when the first message from a particular phone number is received. This URL can be returned to the user any time a new item is added to the wish list. Also, since the wish list is stored and maintained on the system administrator's back end, and not on the user's device itself, it does not take up memory on the user's device. This URL is also accessible to the user from their mobile wireless device or any internet connected device. By simply accessing the user-specific URL, the user can access their wish list at any time. In the user database, these user-specific URLs can be associated with the specific user device contact identifier. The URL can be provided in text for entry to a user, or it can be hyperlinked, such that when a user clicks on a URL returned to a user via cellular message, it automatically launches a user's web browser on the smart mobile device, and directs the user to the user-specific list URL.

If a user purchases a particular item, and the user provides (or has previously provided) any type of information that can link the individual purchaser to an item that has been saved to a user specific list, the retailers point of sale ("POS") computer systems can be integrated with, and access, the user specific list and note that the product has been purchased (see, for example, FIG. 32, "Purchased" column). For example, as described above, the user specific list may include user information other than just the user's mobile device phone number. Once a mobile device phone number is obtained, the system can access other public, private, or commercial databases that link a particular mobile device phone number with Jane Doe, or a particular address, or a particular credit card number. This information can also be stored and associated with a user device contact identifier (mobile device phone number). Thus, when a user checks out at a retail location and purchases a product, and provides any information that can be cross referenced to the data provided in, or accessible to, the user-specific list, the system can record that a product on the user's specific list was purchased (see FIG. 32 for an example).

For example, an administrator of the system 100 shown in FIG. 30 may receive a cellular message from a particular user mobile device for the first time. That user device contact identifier may be added to the user database, for example, database 110A in FIG. 30. The system may also be configured to search databases 110B and/or 110C to see if there are any other records that include the same user device contact identifier. If, for example, database 110C has records that this user device contact identifier is associated with an address of 100 Main Street, Anywhere, Calif., that information can be added to the user database. Later, if a retailer is checking out a customer, and the customer provide information associated with that address, either directly or derivable from some other linked/cross-referenced database, the system may determine that the user associated with the user device contact identifier has purchased the product.

Examples of the present invention are directed to methods, computer systems, and computer-readable media for use in providing the system and methods disclosed herein. An internet-based system can be utilized to provide such information to a user for viewing by users, and various aspects of the invention can be used without access to internet-based systems. An exemplary operating environment suitable for use in implementing embodiments of the present invention is described below. The example environment is an example of one suitable computing environment and is not intended to limit the scope of use or functionality of embodiments of the invention. In addition, the computing environment should not be interpreted as having any dependency or requirement relating to any single component or combination of components.

Other general purpose or special purpose computing system environments or configurations might be used to perform functions of the present invention. Computing systems, environments, and/or configurations that might be suitable for use with the present invention include, for example, personal computers, server computers, hand-held or laptop devices, multiprocessor systems, microprocessor-based systems, set top boxes, programmable consumer electronics, network PCs, minicomputers, mainframe computers, distributed computing environments that include any of the above-mentioned systems or devices, and the like.

The present invention might be described in the general context of computer-executable instructions, such as program modules, being executed by a computer. Exemplary program modules comprise routines, programs, objects, components, and data structures that perform particular tasks or implement particular abstract data types. The present invention might be practiced in a computing environment using remote devices that are connected to one another through a communications network to perform tasks described herein.

The exemplary computing environment comprises a general purpose computing device in the form of a control server. Control server may include, for instance, a processing unit, internal system memory, and a suitable system bus for coupling various system components, including database cluster, with the control server. The system bus might be any of several types of bus structures, including a memory bus or memory controller, a peripheral bus, and a local bus, using any of a variety of bus architectures. Exemplary architectures comprise Industry Standard Architecture (ISA) bus, Micro Channel Architecture (MCA) bus, Enhanced ISA (EISA) bus, Video Electronic Standards Association (VESA) local bus, and Peripheral Component Interconnect (PCI) bus, also known as Mezzanin bus.

The control server typically includes, or has access to, a variety of computer-readable media, for instance, database cluster. Computer-readable media can be any available media that might be accessed by control server, and includes volatile and nonvolatile media, as well as, removable and non-removable media. Computer-readable media might include computer storage media. Computer storage media includes volatile and nonvolatile media, as well as removable and non-removable media implemented in any method of technology for storage of information, such as computer-readable instructions, data structures, program modules, or other data. In this regard, computer storage media might comprise RAM, ROM, EEPROM, flash memory or other memory technology, CD-ROM, digital versatile disks (DVDs) or other optical disk storage, magnetic cassettes, magnetic tape, magnetic disk storage, or other magnetic storage device, or any other medium which can be used to store the desired information and which may be accessed by the control server. Combinations of any of the above also may be included within the scope of computer-readable media. The computer storage media discussed above, including database cluster, provide storage of computer-readable instructions, data structures, program modules, and other data for the control server.

The exemplary control server operates in a computer network using logical connections to one or more remote computers. Remote computers might be located at a variety of locations, including user locations. Exemplary computer networks comprise local area networks (LANs) and/or wide area networks (WANs), or wireless internet systems. Such networking environments are commonplace in offices, enterprise-wide computer networks, intranets, and the Internet. When utilized in a WAN networking environment, the control server might comprise a modem or other means for establishing communications over the WAN, such as the Internet. In a networked environment, program modules or portions thereof might be stored in association with the control server, the database cluster, or any of the remote computers. For example, various application programs may reside on the memory associated with any one or more of the remote computers. The network connections shown are exemplary and other means of establishing a communications link between the computers may be used. In one embodiment, a user may access the system over a wireless internet connection while a provider, accessing the system in their office, may access the system via a LAN network. The control server and/or remote computers might comprise peripheral output devices, such as a monitor(s), a speaker(s) and a printer. Further, other internal components of the control server and the remote computers are not described, but such components and their interconnection are well known.

Although particular embodiments of the present disclosure have been described, it is not intended that such references be construed as limitations upon the scope of this disclosure except as set forth in the claims.

We claim:

1. A method of tracking and retargeting product-specific purchasing intent comprising:
   a. receiving a first multimedia cellular message that includes a product identifier and a user device contact identifier, wherein the product identifier is interpreted from an image of a machine readable product code and wherein the user device contact identifier identifies a wireless user device that interpreted the product identifier;
   b. searching at least one database for a digital product record associated with the product identifier, wherein the digital product record includes first product data for a first product;
   c. storing the first product data in a user-specific digital list, wherein the user-specific digital list is associated with the user device contact identifier;
   d. updating a user-specific viewable digital list associated with the user device contact identifier with at least a subset of the first product data, wherein the user-specific viewable digital list is accessible at a user device contact identifier-specific URL and the subset of first product data comprises a product image and product name of the first product; and
   e. transmitting a second cellular message to a first wireless user device identified by a first user device contact identifier, wherein the second multimedia cellular message includes a first embedded link to a user device contact identifier-specific URL.

2. The method of claim 1, wherein the first product data includes the first product identifier, wherein the method further comprises:
   g. storing a set of retailer-specific promotion notification rules associated with a second product data;
   h. comparing the first product data in the first user-specific digital list to the second product data associated with the retailer-specific promotion notification rules, and
   i. if, the first product data is the same as the second product data associated with a retailer-specific promotion notification rules, transmitting a retailer-specific promotional notification to the first wireless user device associated with the first user device contact identifier via the second cellular message or a third cellular message.

3. The method of claim 1, further comprising transmitting a product image and a product name of the first product in the second cellular message or a third cellular message to the first wireless user device identified by the first user device contact identifier.

4. The method of claim 1, wherein the user-specific viewable digital list accessible at the user device contact identifier-specific URL includes a first embedded link to a retailer-specific URL for the first product.

5. The method of claim 1 wherein the first product data includes the size and the color of the first product.

6. The method of claim 1, wherein the user-specific digital list stores a first date associated with the receipt of the first multimedia cellular message and wherein the method further comprises transmitting a retailer-specific promotion notification to the wireless user device identified by the device identifier in response to a time period lapsing, wherein the time period is set to begin on the first date.

7. The method of claim 2 further comprising:
   j. transmitting a product image and a product name of the first product in the second cellular message or a third cellular message to the first wireless user device identified by the first user device contact identifier; and
      wherein the user-specific viewable digital list accessible at the user device contact identifier-specific URL includes a first embedded link to a retailer-specific URL for the first product, and wherein the first product data includes the size and the color of the first product.

8. A method of using a wireless user device to capture and track in-store, real-time, product-specific purchasing intent without downloading a mobile application to the wireless user device, said method comprising:

a. receiving a first cellular message from the wireless user device over a cellular network, wherein the wireless user device has an associated user device contact identifier, and wherein said first cellular message contains the user device contact identifier and a human-readable product identifier, wherein the product identifier is interpreted by a code scan application from an image of a tag of consumer product comprising a machine readable product code;

b. automatically searching at least one consumer product information computer database using the human-readable product identifier, said consumer product information computer database having consumer product records associated with the human-readable product identifier, and retrieving consumer product data associated with the human-readable product identifier, said retrieved consumer product data comprising:
  i. consumer product name;
  ii. consumer product image;
  iii. consumer product price;
  iv. consumer product size; and
  v. consumer product color c. storing the human-readable product identifier, the user device contact identifier, and the retrieved consumer product data in a user-specific list in a user database;

d. updating a user-specific viewable digital list associated with the user device contact identifier with at least a subset of the retrieved consumer product data, wherein the user-specific viewable digital list is accessible at a user device contact identifier-specific URL and the subset of retrieved consumer product data comprises a product image and product name of the consumer product; and e. automatically transmitting a second cellular message over said cellular network to the wireless user device using the user device contact identifier, said second cellular message comprising at least the consumer product name and the consumer product image.

9. The method of claim 8, further comprising the step of including a first embedded link to the user device contact identifier-specific URL in the second message or a third message to the wireless user device.

10. The method of claim 8, wherein the user-specific viewable digital list includes retrieved consumer product data for the consumer products which the user has sent a product identifier via cellular message.

11. The method of claim 8, wherein the method is performed in server-side logic run in stateless computer containers in response to an event trigger from an event source.

12. The method of claim 11, wherein the event trigger is receipt of the first cellular message from the cellular network.

13. The method of claim 8, further comprising automatically searching a database of retailer rules associated with the consumer product, said retailer rules configurable by a retailer to automatically send a retailer-specific promotion via cellular message to the consumer addressed to the wireless device contact identifier.

14. A method of using a wireless user device to capture and track in-store, real-time, product-specific purchasing intent without downloading a mobile application to the wireless user device, said method comprising:

a. receiving a first cellular message from the wireless user device over a cellular network, wherein the wireless user device has an associated user device contact identifier, and wherein said first cellular message contains the user device contact identifier and a human-readable product identifier interpreted by a code scan application from an image of a tag of consumer product comprising a machine readable product code;

b. automatically searching at least one consumer product information computer database using the human-readable product identifier, said consumer product information computer database having consumer product records associated with the human-readable product identifier, and retrieving consumer product data associated with the human-readable product identifier, said retrieved consumer product data comprising consumer product name;

c. storing the human-readable product identifier, the user device contact identifier, and the retrieved consumer product data in a user-specific list in a user database;

d. automatically transmitting a second cellular message over said cellular network to the wireless user device using the user device contact identifier, said second cellular message comprising at least the consumer product name and consumer product image.

15. The method of claim 14, further comprising updating a user-specific viewable digital list associated with the user device contact identifier with at least a subset of the consumer product data, wherein the user-specific viewable digital list is accessible at a user device contact identifier-specific URL and the subset of consumer product data comprises a product image and product name of the first product.

16. The method of claim 15 wherein an embedded link to the user device contact identifier-specific URL is sent to the wireless user device identified by the first user device contact identifier in the second cellular message or a third cellular message.

17. The method of claim 16, wherein the method is performed in server-side logic run in stateless computer containers in response to an event trigger from an event source.

18. The method of claim 1, wherein the second cellular message comprises a notification from a retailer that the first product has gone on sale.

19. The method of claim 18, further comprising:
  g. receiving a third cellular message from the user device that includes information associated with a credit card and an authorization to purchase the product via the credit card.

20. The method of claim 1, further comprising:
  g. transmitting, via either the second cellular message or a third cellular message, a first discounted price for the first product, and wherein the first discounted price is generated based on instructions provided by a retailer.

* * * * *